United States Patent
Kimura

(10) Patent No.: US 8,594,692 B2
(45) Date of Patent: Nov. 26, 2013

(54) BASE STATION DEVICE AND METHOD FOR ALLOCATING COMMUNICATION BAND BASED ON BAND PRIORITY, WEIGHT FACTORS, INTERFERENCE AND/OR OTHER PARAMETERS

(75) Inventor: Dai Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 13/020,520

(22) Filed: Feb. 3, 2011

(65) Prior Publication Data

US 2011/0218007 A1    Sep. 8, 2011

(30) Foreign Application Priority Data

Mar. 8, 2010  (JP) ................................ 2010-050094

(51) Int. Cl.
  *H04W 72/00*  (2009.01)
(52) U.S. Cl.
  USPC ........ 455/452.2; 455/436; 455/464; 455/509; 370/252; 370/329
(58) Field of Classification Search
  USPC ............................................... 455/63.3, 447
  See application file for complete search history.

(56) References Cited

U.S. PATENT DOCUMENTS

| | | | |
|---|---|---|---|
| 6,023,623 A * | 2/2000 | Benkner et al. ............ | 455/452.2 |
| 7,392,054 B2 | 6/2008 | Cho et al. | |
| 7,738,422 B2 | 6/2010 | Das et al. | |
| 8,311,001 B2 | 11/2012 | Kimura et al. | |
| 2005/0282550 A1 * | 12/2005 | Cho et al. ...................... | 455/447 |
| 2008/0057934 A1 | 3/2008 | Sung et al. | |
| 2008/0057996 A1 | 3/2008 | Sung et al. | |
| 2008/0253319 A1 | 10/2008 | Ji et al. | |
| 2009/0196193 A1 * | 8/2009 | Frenger et al. ................ | 370/252 |
| 2010/0034108 A1 | 2/2010 | Ode | |
| 2010/0075689 A1 | 3/2010 | Uemura et al. | |
| 2011/0300873 A1 | 12/2011 | Wen et al. | |
| 2012/0008489 A1 | 1/2012 | Higuchi et al. | |

FOREIGN PATENT DOCUMENTS

| | | |
|---|---|---|
| JP | 2006-217415 | 8/2006 |
| JP | 2008-42861 A | 2/2008 |
| JP | 2008-048148 A | 2/2008 |

(Continued)

OTHER PUBLICATIONS

"Extended European Search Report", mailed by EPO and corresponding to European application No. 11155630.4 on Jul. 21, 2011.

(Continued)

*Primary Examiner* — Nay A Maung
*Assistant Examiner* — Alejandro Rivero
(74) *Attorney, Agent, or Firm* — Fujitsu Patent Center

(57) ABSTRACT

A base station device is provided with a receiver, an interference comparator, an allocation unit, and a transmitter. The receiver receives an interference parameter indicating a level of interference of the first mobile station with the second mobile station. The interference comparator compares the interference parameter with a predetermined interference threshold value. The allocation unit allocates a communication band to the first mobile station such that the probability that the first band will be allocated to the first mobile station becomes larger than the probability that the second band will be allocated to the first mobile station when a level of interference represented by the interference parameter is larger than a level of interference represented by the interference threshold value. The transmitter transmits information of an allocated band to the first mobile station.

8 Claims, 20 Drawing Sheets

(56) References Cited

FOREIGN PATENT DOCUMENTS

| | | |
|---|---|---|
| JP | 2008-061249 A | 3/2008 |
| JP | 2008-061250 | 3/2008 |
| JP | 2009-206945 A | 9/2009 |
| JP | 2009-171613 A | 3/2010 |
| JP | 2010-206476 A | 9/2010 |
| WO | WO-2007/023043 A1 | 3/2007 |
| WO | WO-2008/030867 A2 | 3/2008 |
| WO | WO-2008/053550 A1 | 5/2008 |
| WO | WO-2010/096946 A1 | 9/2010 |

OTHER PUBLICATIONS

"Performance analysis and simulation results of Uplink ICIC", 3GPP TSG RAN WG1 #51bis Meeting, R1-080331, Jan. 14, 2008.

Japanese Office Action mailed May 28, 2013 for corresponding Japanese Application No. 2010-050094, with English-language Translation.

* cited by examiner

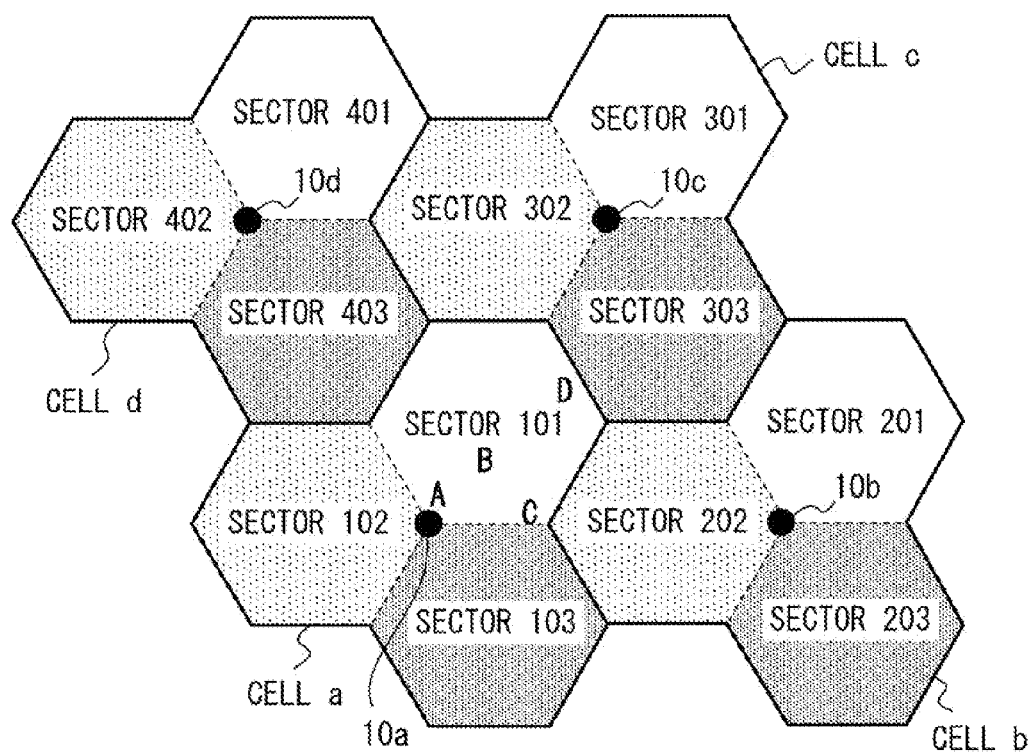
F I G. 2

| SECTOR ID | PRIORITY BAND |
|---|---|
| 102 | BAND 2 |
| 103 | BAND 3 |
| 201 | BAND 1 |
| 202 | BAND 2 |
| 203 | BAND 3 |
| 301 | BAND 1 |
| 302 | BAND 2 |
| 303 | BAND 3 |
| 401 | BAND 1 |
| 402 | BAND 2 |
| 403 | BAND 3 |

F I G. 5

| SECTOR ID | PRIORITY BAND | WEIGHTING PATTERN (PB1, PB2, PB3) | RECEIVED POWER (dBm) |
|---|---|---|---|
| 101 | BAND 1 | (1, 1, 1) | −60 |
| 201 | BAND 1 | (1, 1, 1) | −145 |
| 301 | BAND 1 | (1, 1, 1) | −150 |
| 401 | BAND 1 | (1, 1, 1) | −160 |
| 102 | BAND 2 | (1, 0, 2) | −130 |
| 202 | BAND 2 | (1, 0, 2) | −135 |
| 302 | BAND 2 | (1, 1, 1) | −150 |
| 402 | BAND 2 | (1, 1, 1) | −170 |
| 103 | BAND 3 | (1, 1, 1) | −155 |
| 203 | BAND 3 | (1, 1, 1) | −165 |
| 303 | BAND 3 | (1, 1, 1) | −150 |
| 403 | BAND 3 | (1, 1, 1) | −160 |

F I G. 6

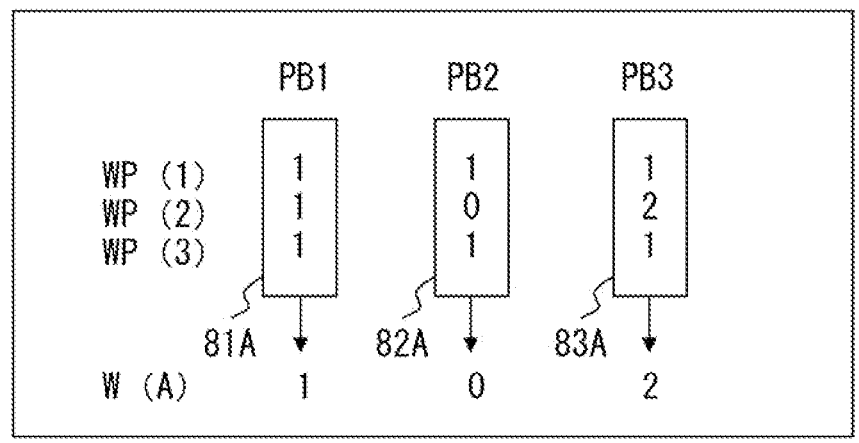
F I G. 7 A

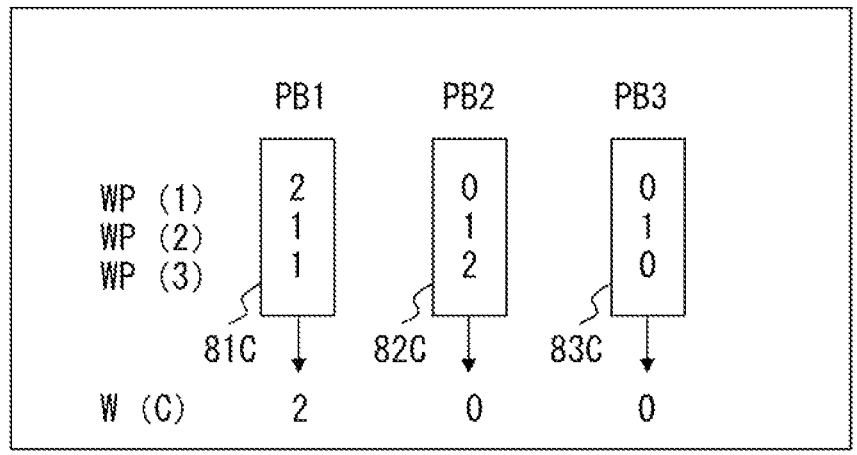
F I G. 7 C

| MOBILE STATION | PB1 | PB2 | PB3 |
|---|---|---|---|
| A | F (A, 1) | 0 | 2F (A, 3) |
| B | F (B, 2) | F (B, 2) | F (B, 3) |
| C | 2F (C, 1) | 0 | 0 |
| D | 2F (D, 1) | 0 | 0 |

FIG. 8

| MOBILE STATION | RECEPTION STATUS FROM COMMUNICATION SECTOR | INTERFERENCE TO SECTOR × 02 | INTERFERENCE TO SECTOR × 03 | ALLOCATED REGION |
|---|---|---|---|---|
| A | GOOD | LARGE | SMALL | BAND 3 |
| B | GOOD | SMALL | SMALL | BAND 2 |
| C | BAD | SMALL | LARGE | BAND 1 |
| D | BAD | SMALL | SMALL | |

F I G. 9

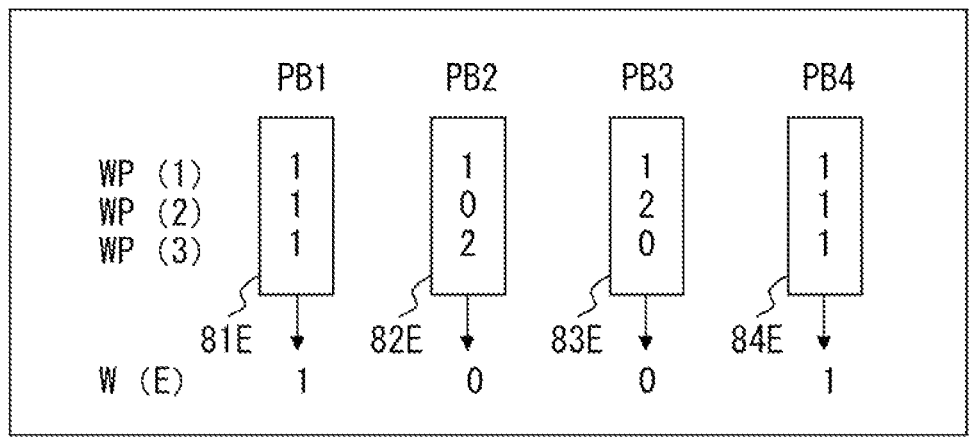
F I G. 1 2

| SECTOR ID | PRIORITY BAND | WEIGHTING PATTERN (PB1, PB2, PB3) | RECEIVED POWER (dBm) | POWER REDUCTION LEVEL (dBm) |
|---|---|---|---|---|
| 101 | BAND 1 | (1, 1, 1) | -60 | |
| 201 | BAND 1 | (1, 1, 1) | -145 | -5 |
| 301 | BAND 1 | (1, 1, 1) | -150 | -10 |
| 401 | BAND 1 | (1, 1, 1) | -160 | -20 |
| 102 | BAND 2 | (1, 0, 2) | -130 | 10 |
| 202 | BAND 2 | (1, 0, 2) | -135 | 5 |
| 302 | BAND 2 | (1, 1, 1) | -150 | -10 |
| 402 | BAND 2 | (1, 1, 1) | -170 | -30 |
| 103 | BAND 3 | (1, 1, 1) | -155 | 5 |
| 203 | BAND 3 | (1, 1, 1) | -165 | -25 |
| 303 | BAND 3 | (1, 1, 1) | -150 | -10 |
| 403 | BAND 3 | (1, 1, 1) | -160 | -20 |

FIG. 13

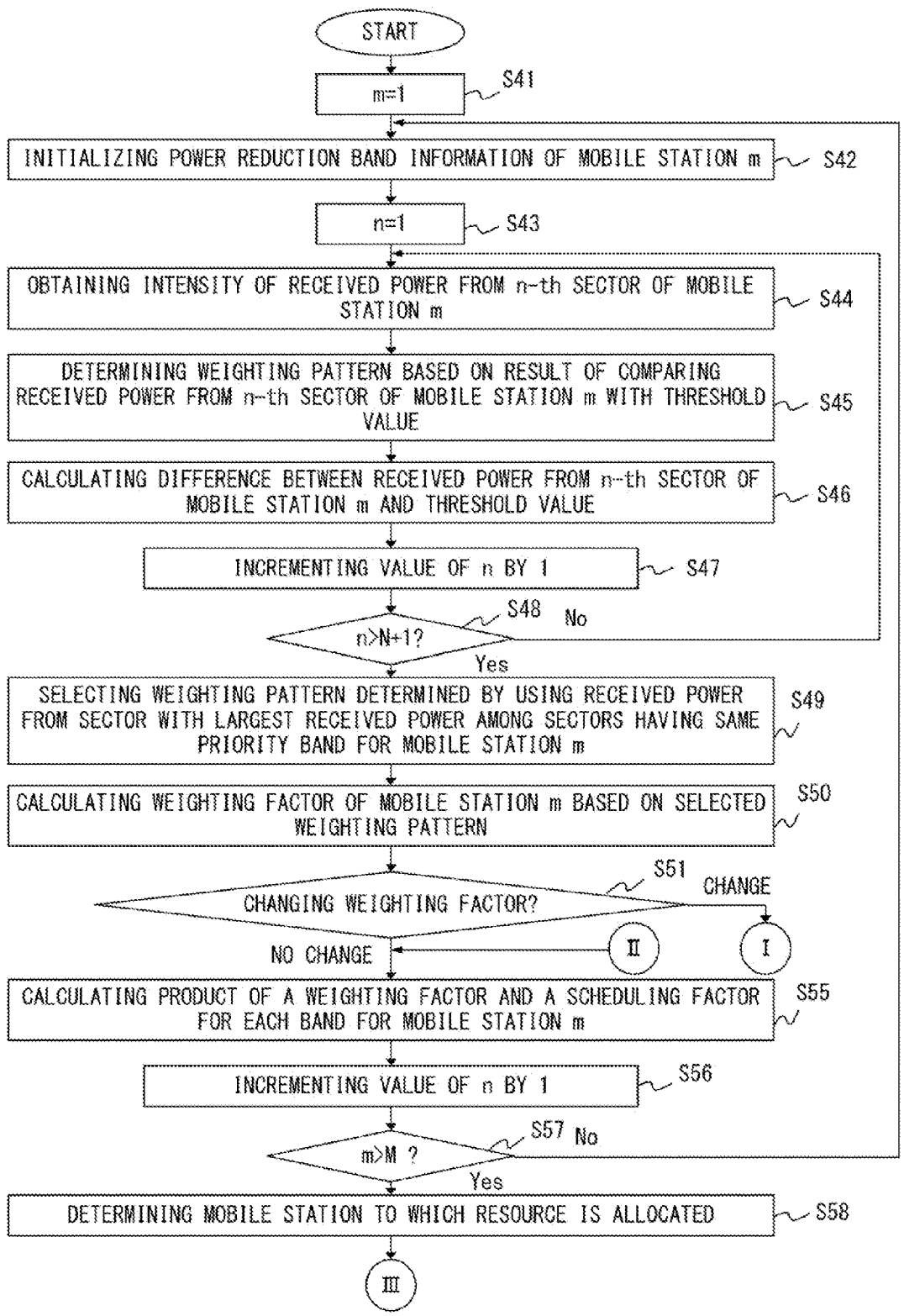
F I G. 1 4 A

BASE STATION DEVICE AND METHOD FOR ALLOCATING COMMUNICATION BAND BASED ON BAND PRIORITY, WEIGHT FACTORS, INTERFERENCE AND/OR OTHER PARAMETERS

CROSS-REFERENCE TO RELATED APPLICATIONS

This application is based upon and claims the benefit of priority of the prior Japanese Patent Application No. 2010-050094, filed on Mar. 8, 2010, the entire contents of which are incorporated herein by reference.

FIELD

The present invention relates to a base station device used in radio communications and a method for allocating a communication band to a mobile station that communicates with a base station device.

BACKGROUND

In recent years, the volume of communications traffic via radio has increased. However, the frequency band used in radio communications is limited. Accordingly, it is desired that the utilization ratio of the frequency band should be improved. As a method for improving the utilization ratio of the frequency band, it is possible for example to adopt a configuration in which every base station can allocate the entire band of the frequency used in radio communications to a mobile station, as in Orthogonal Frequency-Division Multiplexing (OFDM) of downstream links or the single-carrier transmission of upstream links in Long Term Evolution (LTE). However, in communications in which each base station allocates the entire band of the frequencies used in radio communications, a mobile station located in one cell may interfere with the communications of a mobile station located in a nearby cell. Moreover, the communication state of a mobile station located at an edge of a cell may deteriorate not only because the received power at the communicating base station becomes weak in the upstream link due to being a long distance from the base station but also because the interference caused due to a mobile station belonging to a nearby cell becomes large. Accordingly, the average throughput or the coverage in the whole system may deteriorate due to interference with a cell caused by a mobile station located at an edge of a nearby cell. Further, when the service area of a cell is divided into several sectors, the above problem may occur due to the interference between sectors. For example, when the service area of one cell is divided into three sectors, as illustrated in FIG. 1A, in addition to interference among the cells a-d, interference among the sectors within the cells a-d may also occur.

In view of the above problems, Inter-Cell Interference Coordination (ICIC) is known as a method for preventing interference between nearby cells or sectors. In ICIC, the frequency band is divided into several bands, as illustrated in FIG. 1B. In the example of FIG. 1B, the frequency band is divided into three bands. The base station 1 (1a-1d) selects for each sector a band to be allocated to a mobile station located at an edge of a sector. At this time, the base station 1 selects bands in such a manner that the band allocated to a mobile station located at an edge of a sector will not be the same band as that of a nearby sector. For example, the base station la of the cell a allocates the band 1, the band 2, and the band 3 to mobile stations located at the edges of the sector 101, the sector 102, and the sector 103, respectively. Moreover, the base station la of the cell a selects bands in such a manner that the band allocated to a mobile station located at the edge of the sector will not be the same band as the band of a nearby sector that is also between the sectors of the cells b-d and the sectors of the cell a. Here, FIG. 1B illustrates an example in which the base station 1 allocates bands to mobile stations located at the edges of the sectors, where "sector x01" indicates that the last two digits of the sector ID are "01" and the third or larger digits are arbitrary. The same applies to "sector x02" and "sector x03". In other words, the band 1 is allocated to the mobile stations located at the edges of the group of sectors 101, 201, 301, and 401. The band 2 is allocated to the mobile stations located at the edges of the group of sectors 102, 202, 302, and 402. Then the band 3 is allocated to the mobile stations located at the edges of the group of sectors 103, 203, 303, and 403, respectively. Here, whether a mobile station is located at an edge of a sector is determined, for example, by a ratio of the path-loss (PL1) between the base station that forms the sector in which the path-loss is the smallest and the mobile station to the path-loss (PL2) between the base station that forms the sector in which the path-loss is the second smallest and the mobile station. In other words, the base station determines that a mobile station whose PL1/PL2 ratio value is larger than a threshold value is located at an edge of a sector. Here, a path-loss is a value indicating the magnitude of the propagation loss. Normally, the sector in which the path-loss is the smallest is the sector in which the mobile station is located. A small PL1 value indicates that the communication state with a base station forming a communicating sector is good. A small PL2 value indicates that the interference of a mobile station with other mobile stations located in a nearby sector is large.

It is a known technology to allocate to a mobile station the frequency allocated to a nearby base station when the mobile station is located near the center of a cell, and to allocate a frequency different from the frequency allocated to a nearby base station when the mobile station is located near the boundary of the cell of the nearby base station. Alternatively, it is also a known technology to schedule an uplink resource with reference to the uplink control information generated on the basis of the information of the interference amount among cells. It is a known process to determine the transmission power for each frequency band used for the data transmission on the basis of the power characteristic of the radio channel measured from a pilot signal. Furthermore, it is a known scheduling process to form a group of mobile stations on the basis of the positional information of those mobile stations, and to allocate a communication slot of the same time channel or the same frequency channel to a mobile station that belongs to the same group.

PRIOR ART DOCUMENTS

Patent Documents

Patent Document 1: Japanese Laid-open Patent Publication No. 2008-48148
Patent Document 2: Japanese Laid-open Patent Publication No. 2008-61249
Patent Document 3: Japanese Laid-open Patent Publication No. 2008-61250
Patent Document 4: Japanese Laid-open Patent Publication No. 2006-217415

Non-Patent Documents

Non-Patent Document 1: 3GPP TSG RAN WG1 #51b is Meeting, R1-080331, "Performance analysis and simulation results of uplink ICIC"

In cases where a communication band is allocated on the basis of the value of PL1/PL2 in an upstream link, even if the interference with a different mobile station located in a nearby sector is large, the band to be allocated to a mobile station will remain unchanged as long as the communication state with a communicating sector is good and the value of PL1 is small. However, if the interference of one mobile station with another mobile station becomes large, the throughput in the whole system may deteriorate. For this reason, if the communication band is allocated on the basis of the value of PL1/PL2, the throughput of the system may not improve. The communication process used in the LTE has been described as a background art, but it is desirable to be able to reduce the interference between nearby sectors for any method in which the allocateable communication band among nearby base stations overlaps, such as the Code Division Multiple Access (CDMA) method.

SUMMARY

A base station device according to an embodiment of the present invention is used in a system in which a first band is allocated on a priority basis to a first mobile station located at a first region, and a second band is allocated on a priority basis to a second mobile station located at a second region. This base station device is provided with a receiver, an interference comparator, an allocation unit, and a transmitter. The receiver receives an interference parameter indicating the level of interference of the first mobile station with the second mobile station. The interference comparator compares the interference parameter with a predetermined interference threshold value. The allocation unit allocates a communication band to the first mobile station such that the probability that the first band will be allocated to the first mobile station becomes larger than the probability that the second band will be allocated to the first mobile station when the level of interference represented by the interference parameter is larger than the level of interference represented by the interference threshold value. The transmitter transmits the information of which band was allocated to the first mobile station.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 2 is a diagram illustrating a configuration example of cells formed by base stations according to an embodiment.

FIG. 5 is a diagram illustrating an example interference sector table.

FIG. 6 is a diagram illustrating an example method for storing weighting patterns in a buffer.

FIGS. 7A-7D are diagrams illustrating an example method for calculating a weighting factor.

FIG. 8 is a table illustrating example values of the product of a weighting factor and a scheduling factor.

FIG. 9 is a diagram illustrating an example result of allocating a communication band to a mobile station.

FIG. 12 is a diagram illustrating an example calculation of a weighting factor of a mobile station E.

FIG. 13 is a diagram illustrating an example method for storing the difference between an interference parameter and an interference threshold value.

FIG. 14A is a flowchart illustrating example operations of abase station according to the fourth embodiment.

DESCRIPTION OF EMBODIMENTS

Figure 1A:
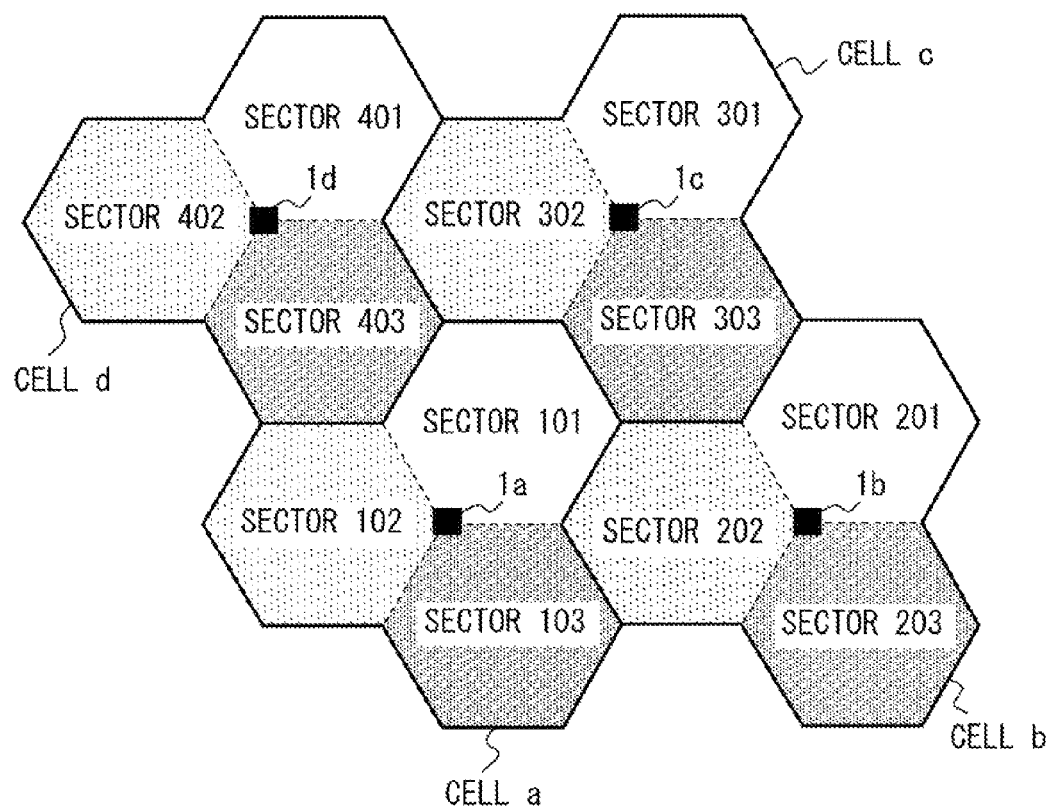
FIGS. 1A and 1B are diagrams illustrating an example method for allocating a band to a mobile station located at the edge of a sector.
Figure 1:
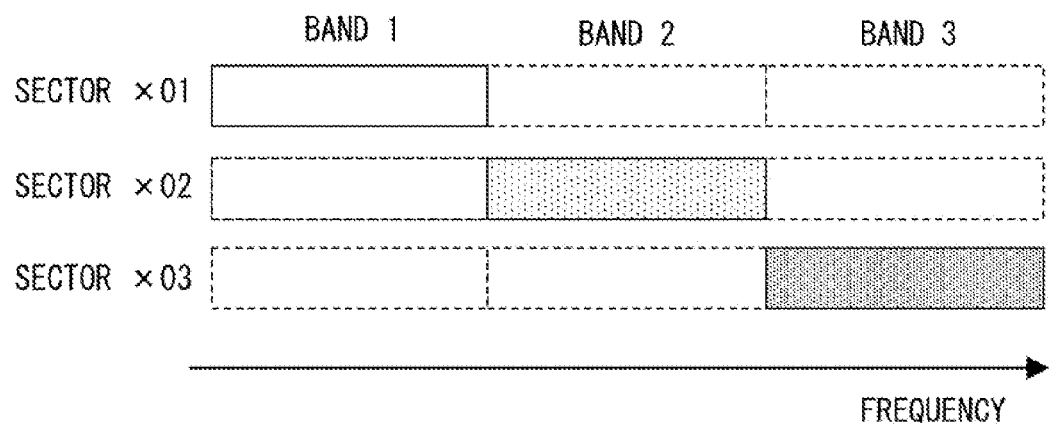

Some embodiments will be described in detail with reference to the accompanying drawings.

FIG. 2 is a diagram illustrating a configuration example of cells formed by base stations 10 (10a-10d) according to an embodiment. Here, "A-D" in FIG. 2 of a sector 101 represents mobile stations A-D. In the following description, a sector in which a certain mobile station is located may be refererred to as a "communication sector" of that mobile station. For example, the communication sector of a mobile station A is the sector 101. Further, in the following description, a sector which may interfere with a communication sector may be refererred to as an "interference sector".

The base station according to the present embodiment is used in a system in which a first region and a second region are formed. A first priority band is allocated to a mobile station that is located at the first region with a poor communication state, and a second priority band is allocated to a mobile station that is located at the second region with a poor communication state.

Here, the first region and the second region may be two sectors formed by the same base station, or may be cells or sectors formed by different base stations. For example, when the first region is the sector 101, the second region may be a sector 102 or a sector 403. Further, the first region and the second region may be sectors adjoining each other, or may be sectors not adjoining each other. That is, when the first region is the sector 101, the second region maybe a sector 201. In the following description, cases are described in which each of the four cells a-d is divided into three sectors, but each cell may be divided into any number of sectors. For example, each of the cells a-d may be an omnicell which is not divided into a number of service areas, or may be a cell which is divided into six sectors.

In the following description, a band allocated by a base station forming sectors or an omnicell to a mobile station with a poor communication state among mobile stations located in a sector or an omnicell may be referred to as a "priority band". In the following example, the base station 10 divides a communication band into three sectors, as illustrated in FIG. 1B, and one of the bands 1-3 becomes the priority band of the sectors. Here, communication band refers to a frequency region that the base station 10 can allocate to a mobile station that is communicating with the base station 10. Accordingly, a band to be allocated to a mobile station may be in a frequency band of the communicating band and other than the priority band being used in the sector in which that mobile station is located.

The base station 10 selects priority bands such that the priority bands do not overlap between the adjoining sectors. In the following description, the band 1 is used as a priority band in sectors 101, 201, 301, and 401, the band 2 is used as a priority band in sectors 102, 202, 302, and 402 and the band 3 is used as a priority band in sectors 103, 203, 303, and 403.

The base station 10 according to an embodiment receives an interference parameter from a first mobile station in order to determine the level of interference of the first mobile station located at a first region with a second mobile station located at a second region. Here, the interference parameter may be, for example, a level of the received power received from the base station that forms the second region, a level of path-loss with the base station that forms the second region, or a distance from the base station that forms the second region. For example, the interference parameter indicating the interference of the mobile station A with the sector 202 may be a level of the received power that the mobile station A receives from an antenna that forms the sector 202 of the base station 10b, or may be a path-loss or distance between the mobile station A and the base station 10b.

The base station 10 preliminarily holds an interference threshold value. Here, the interference threshold value is a value of the interference parameter indicating the level of interference that the first mobile station may cause to a mobile station located at the second region. The base station 10 compares the received interference parameter with the interference threshold value. When the level of interference indicated by the interference parameter is larger than the level of interference indicated by the interference threshold value, the base station 10 determines that the interference of the first mobile station with the second mobile station is unacceptably large. On this occasion, the base station 10 reduces the probability that a second priority band will be allocated to the first mobile station, and then allocates a communication band to the first mobile station. The first mobile station communicates with the base station 10 by using the communication band provided in accordance with the allocation determined by the base station 10.

Accordingly, when the interference of the first mobile station with a mobile station at a second region is large, it is unlikely that a second priority band will be allocated to the first mobile station. As a result, the first mobile station will have less of a chance of interfering with a mobile station to which a second priority band is allocated.

Figure 3:
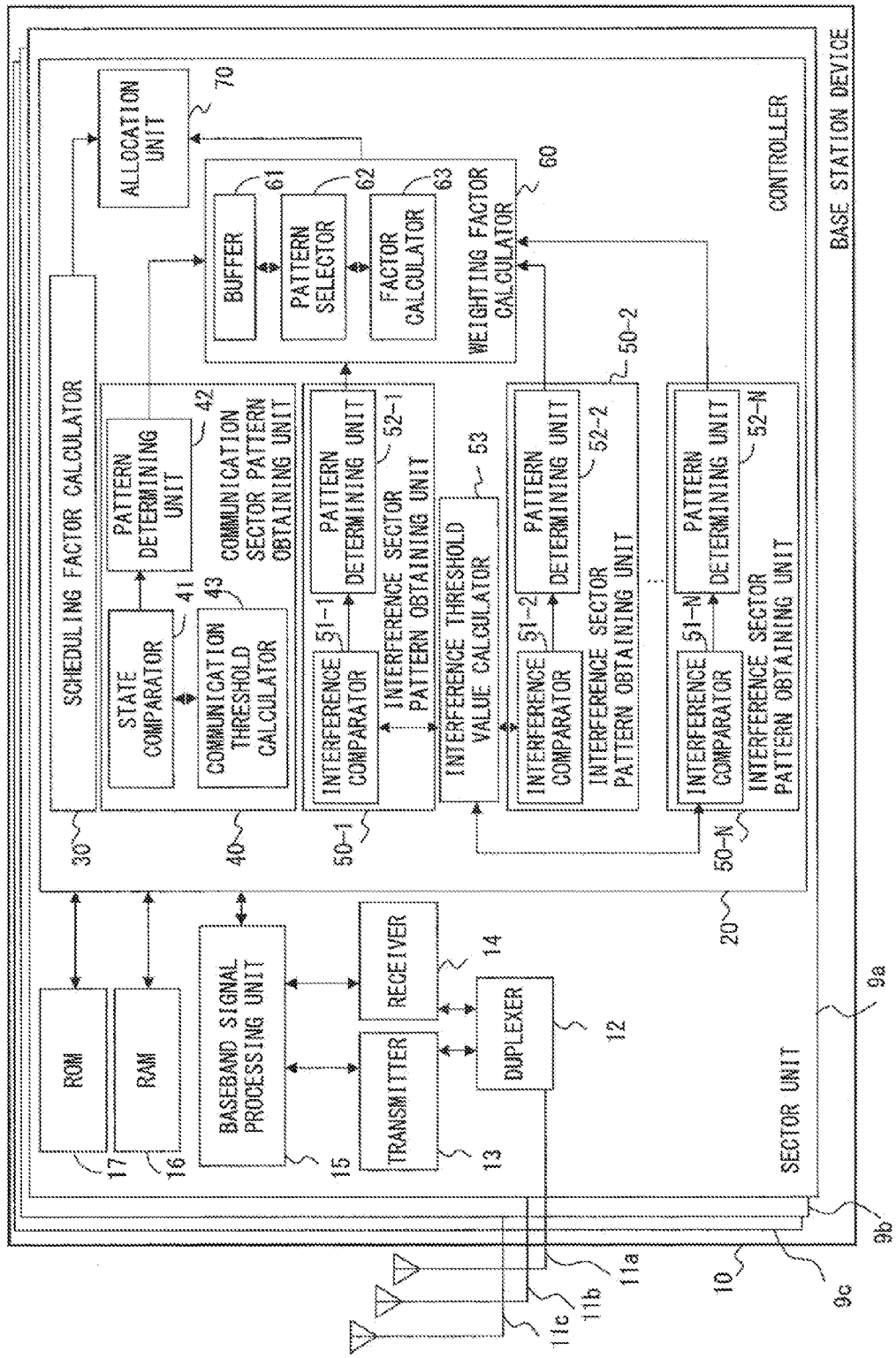
FIG. 3 is a diagram illustrating a configuration example of a base station.

FIG. 3 is a diagram illustrating a configuration example of the base station 10. The base station 10 is provided with an antenna 11 (11a-11c), a duplexer 12, a transmitter 13, a receiver 14, a baseband signal processing unit 15, a Random Access Memory (RAM) 16, a Read Only Memory (ROM) 17, and a controller 20. In the example of FIG. 3, the base station 10 controls each of the three sectors independently within the base station 10 by using a sector unit 9 (9a-9c), and a configuration example of a sector unit 9a that controls the sector 101 of the base station 10a is illustrated. Although the sector unit 9a is particularly illustrated in FIG. 3, it is to be understood that a sector unit 9b that controls the sector 102 as well as a sector unit 9c that controls the sector 103 have the same configuration as that illustrated in FIG. 3. Note that an antenna 11a forms the sector 101.

The duplexer 12 connects the transmitter 13 and the receiver 14 to the antenna 11a. The duplexer 12 connects the antenna 11a to the transmitter 13, for example, when the base station 10 transmits data such as control data to send the transmission power to a mobile station. Moreover, the duplexer 12 connects the antenna 11a to the receiver 14 when the base station 10 receives data such as a value of the received power from the mobile station. The transmitter 13 performs the processing for transmitting a signal to a mobile station such as the processing of multiplying a signal input from the baseband signal processing unit 15 by a carrier wave. The receiver 14 removes a carrier wave from the input high frequency to generate a baseband signal, and outputs the generated baseband signal to the baseband signal processing unit 15. The baseband signal processing unit 15 outputs reception data to the controller 20. The RAM 16 is used, for example, for executing a program. The ROM 17 not only stores the data but stores the data used for operating the base station 10 as necessary. For example, the ROM 17 is capable of storing a table for specifying the range of each sector in which interference may occur.

The controller 20 is provided with a scheduling factor calculator 30, a communication sector pattern obtaining unit 40, an interference sector pattern obtaining unit 50 (50-1-50-N), a weighting factor calculator 60, and an allocation unit 70. The reception data input from the baseband signal processing unit 15 to the controller 20 is used for the processing in the scheduling factor calculator 30, the communication sector pattern obtaining unit 40, or the interference sector pattern obtaining unit 50.

The scheduling factor calculator 30 calculates a scheduling factor that is used for allocating a communication band. In the following description, the scheduling factor may be referred to as an "allocating factor". The method for calculating a scheduling factor maybe any calculation method, including the Proportional Fairness method, the round robin scheduling (method), or the Maximum carrier-to-interference-and-noise ratio method (Maximum CINR method). The scheduling factor calculator 30 outputs the calculated scheduling factor to the allocation unit 70.

A weighting factor is obtained by the processing performed by the communication sector pattern obtaining unit 40, the interference sector pattern obtaining unit 50, and the weighting factor calculator 60. The weighting factor is used for allocating weights to a scheduling factor. As described above, a communication band is allocated on the basis of the scheduling factor. However, the scheduling factor obtained, for example, by the Proportional Fairness method or the round robin scheduling (method) does not involve the consideration of the level of interference that occurs between sectors or cells. For this reason, the allocation unit 70 uses a value of the scheduling factor that is modified by the weighting factor to allocate a communication band to a mobile station that is communicating with the base station 10.

The communication sector pattern obtaining unit 40 is provided with a state comparator 41 and a pattern determining unit 42, and may optionally be provided with a communication threshold calculator 43. The communication sector pattern obtaining unit 40 obtains a weighting pattern on the basis of the data obtained at a communication sector. The weighting pattern is, as described later, used for calculating a weighting factor. In the following description, the weighting pattern is described as a series such as (PB1, PB2, PB3) where the priority of band 1 (PB1), the priority of band 2 (PB2), and the priority of band 3 (PB3) are sequentially recorded. Here, a larger value for the priority indicates a greater likelihood that a band being used in a certain sector will be allocated to a mobile station. For example, when the scheduling factors have the same value, a mobile station is likely to be allocated with a band where the priority value is 2 rather than a band where the priority value is 1. How the priority or weighting pattern is obtained will be described later.

The state comparator 41 compares the information indicating the communication state of a mobile station located in a sector to be controlled with a threshold (communication threshold) to determine whether the communication state with the mobile station is good. In the following description, the information indicating the communication state of a mobile station may be referred to as a "state parameter". For the state parameter, for example, a level of the received power received from the base station 10, a level of path-loss with the base station 10, and the distance from the base station 10 with respect to a mobile station that is communicating with the base station 10 may be used. For example, the state comparator 41 may use the level of the received power that the mobile station A located in the sector 101 received from the antenna 11*a* forming the sector 101 as a state parameter. The state comparator 41 is capable of preliminarily storing a communication threshold to be compared with a state parameter, or reading that communication threshold from the ROM 17 or the like as necessary. The communication threshold is a value of the state parameter to be used as a reference for determining whether the communication state is poor, and may be, for example, a minimum value of the state parameter required for the communication with a mobile station. An operator or the like can preliminarily determine the communication threshold.

The pattern determining unit 42 is capable of storing a weighting pattern indicating the priority of each communication band that may be allocated to a mobile station, or reading that weighting pattern from the ROM 17 or the like as necessary. An example weighting pattern, how a weighting pattern is determined, or how a weighting pattern is used will be described later. The pattern determining unit 42 determines a weighting pattern in accordance with a comparison result obtained by the state comparator 41, and outputs the determined weighting pattern to the weighting factor calculator 60.

In cases where the communication sector pattern obtaining unit 40 is provided with the communication threshold calculator 43, the state comparator 41 can obtain a communication threshold from the communication threshold calculator 43. The communication threshold calculator 43 calculates the level of the communication threshold on the basis of a comparison result between a level of the communication threshold and a level of the state parameter. Moreover, in response to a request from the state comparator 41, the communication threshold calculator 43 provides the calculated communication threshold to the state comparator 41.

The base station 10 is provided with N number of interference sector pattern obtaining units 50. N represents the number of interference sectors, and may be any positive integer.

The interference sector pattern obtaining unit 50 is provided with an interference comparator 51 and a pattern determining unit 52. The interference comparator 51 (51-1-51-N) compares an interference parameter with an interference threshold value. The interference comparator 51 is capable of preliminarily storing an interference threshold value, or reading that interference threshold value from the ROM 17 or the like as necessary. An operator or the like can preliminarily determine the interference threshold value. The pattern determining unit 52 is capable of storing a weighting pattern, or of reading that weighting pattern from the ROM 17 or the like as necessary. The pattern determining unit 52 determines a weighting pattern in accordance with a comparison result obtained by the interference comparator 51, and outputs the determined weighting pattern to the weighting factor calculator 60. The operation of the pattern determining unit 52 will be described later.

In cases where the interference sector pattern obtaining unit 50 is provided with an interference threshold value calculator 53, the interference comparator 51 can obtain an interference threshold value from the interference threshold value calculator 53. The interference threshold value calculator 53 calculates a level of the interference threshold value on the basis of a comparison result between a level of the interference threshold value and a level of the interference parameter. Moreover, the interference threshold value calculator 53 provides the calculated communication threshold to the interference comparator 51 in response to a request from the interference comparator 51. In the example of the base station 10 in FIG. 3, one interference threshold value calculator 53 is provided, but any number of interference threshold value calculators 53 may be provided. For example, the same number of interference threshold value calculators 53 and interference sector pattern obtaining units 50 may be provided, and the interference threshold value calculators 53 may be integrated into the interference sector pattern obtaining units 50.

The weighting factor calculator 60 is provided with a buffer 61, a pattern selector 62, and a factor calculator 63.

The weighting factor calculator 60 obtains the weighting pattern through the pattern determining unit 42 or the pattern determining units 52-1-52-N, and stores the obtained weighting pattern in the buffer 61. Moreover, the weighting factor calculator 60 notifies the pattern selector 62 when the number of the obtained weighting patterns has reached N+1. The pattern selector 62 selects a weighting pattern to be used for calculating a weighting factor from the weighting patterns stored in the buffer 61, and outputs the selected weighting pattern to the factor calculator 63. For example, one of the weighting patterns selected on the basis of the information from a sector having the same band as a priority band may be used for calculating a weighting factor. On this occasion, the pattern selector 62 selects, for example, one of the weighting patterns determined on the basis of the information from the sectors 101, 201, 301, and 401 for calculating a weighting factor. The factor calculator 63 calculates a weighting factor by using the weighting patterns input from the pattern selector 62, and outputs the calculated factor to the allocation unit 70. The operation of the pattern selector 62 and the factor calculator 63 will be described later in detail.

The allocation unit 70 allocates a communication band to a mobile station by using the scheduling factor input from the scheduling factor calculator 30 and the weighting factor input from the weighting factor calculator 60. The allocation unit 70 can allocate a communication band to a mobile station, for example, by using a resource block. Moreover, the allocation unit 70 can allocate a communication band, for example, in accordance with a preset method or in accordance with any technology such as Long Term Evolution (LTE).

The configuration or operation of the base station 10 varies depending on the implementation. For example, if the base station 10 is provided with only one controller 20, that controller 20 can control several sectors. Moreover, the number of the interference sector pattern obtaining units 50 provided for the base station 10 may be larger than the number of the sectors that may interfere with the sector 101. If this happens, the same number of interference sector pattern obtaining units 50 as the number of sectors that may involve some interference operate. Further, the number of the antennas 11 provided for the base station 10 maybe changed to any number.

<The First Embodiment>

Hereinafter, the operation of the base station 10*a* according to the first embodiment when allocating communication bands to the mobile stations A-D located in the sector 101 will be described. It is assumed that the band allocated to the sector 101 is divided into the three bands 1-3 as illustrated in FIG. 1B, and that the priority band used in the sector 101 is the band 1.

In the following description, it is assumed that the state parameter is a level of the received power that the mobile stations A-D receive from the antenna 11a of the base station 10a. Moreover, it is also assumed that the interference parameter is a level of the received power that the mobile stations A-D receive from the antenna that forms an interference sector. In the following description, it is assumed that the interference sectors are the sectors 102 and 103 and the sectors included in the cells b-d, and that "N" represents the number of the interference sectors is 11. Moreover, it is also assumed that the base station 10 according to the first embodiment is not provided with a communication threshold calculator 43 and an interference threshold value calculator 53, and that the state comparator 41 and the interference comparators 51 (51-1-51-N) store a communication threshold and an interference threshold value, respectively.

The mobile stations A-D provide the control information, including a control signal or the received power from sectors, to the base station 10a. The controller 20 obtains control channel estimation such as of a pilot channel for each mobile station on the basis of the received control signal, and provides the obtained control channel estimation to the scheduling factor calculator 30 together with an identifier of each mobile station. Once control channel estimation is provided, the scheduling factor calculator 30 calculates a scheduling factor. As an example, it is assumed that the scheduling factor calculator 30 calculates a scheduling factor of the mobile station A on the basis of the Proportional Fairness method. The scheduling factor calculator 30 obtains a scheduling factor in accordance with equation (1).

$$\text{Scheduling Factor} = rA/RA \quad (1)$$

Here, "RA" is an average throughput of the mobile station A, and "rA" is a potential throughput obtained from a channel estimation of the mobile station A at a certain moment. The scheduling factor calculator 30 calculates a scheduling factor for each of the bands 1-3. In the following description, for example, a value of the scheduling factor of the band 1 of the mobile station A is represented as "F(A,1)". That is, an identifier of the mobile station and an identifier of the band are described in parentheses after "F" in pairs. The scheduling factor calculator 30 calculates scheduling factors of the bands 1-3 for each of the mobile stations A-D, and outputs the calculated scheduling factor to the allocation unit 70.

Apart from the scheduling factor, the controller 20 calculates a weighting factor. Here, the controller 20 may calculate a scheduling factor and a weighting factor in parallel, or may calculate either the scheduling factor or the weighting factor first.

Figure 4:
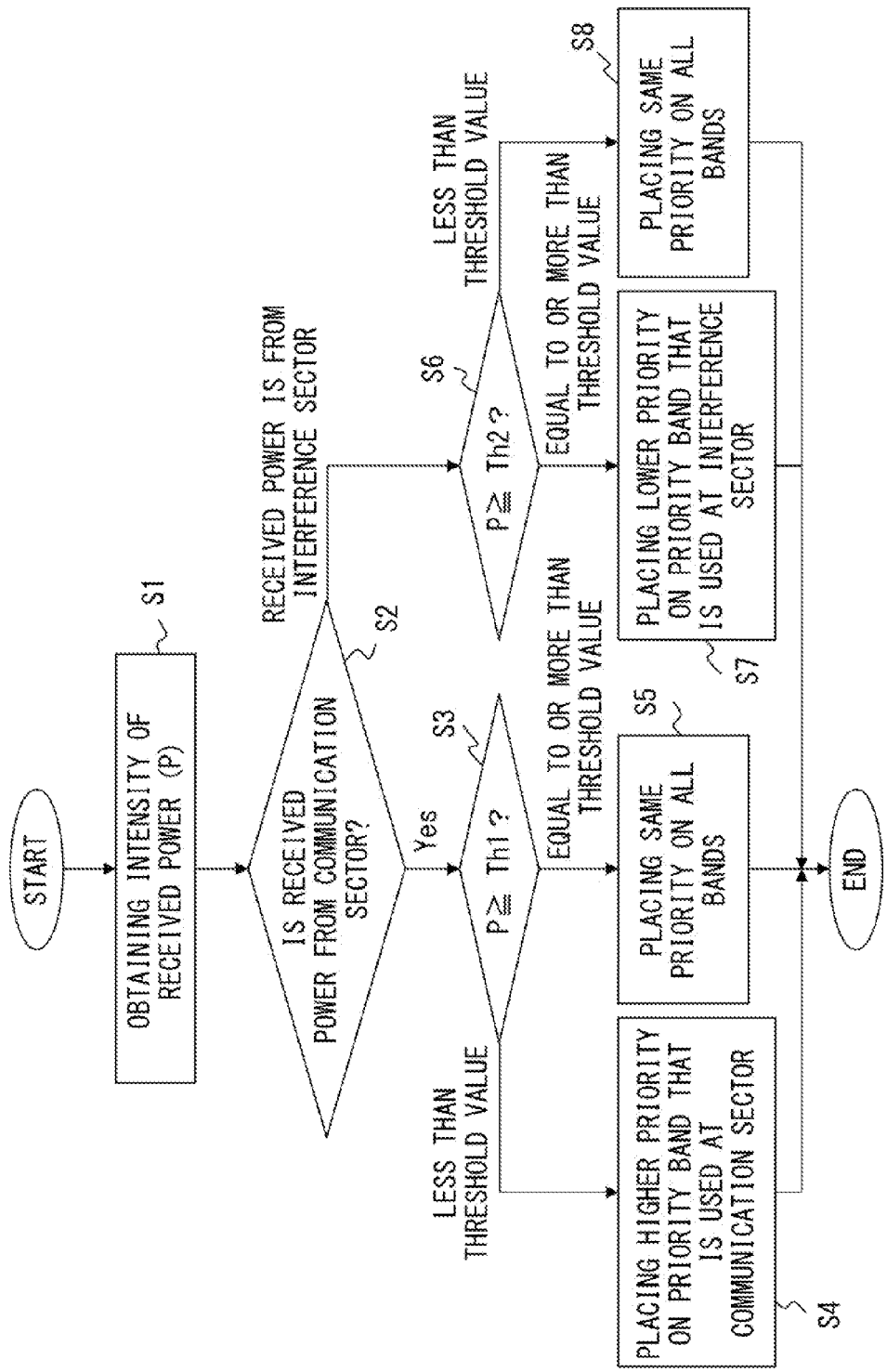
FIG. 4 is a flowchart illustrating an example operation of controller when a weighting pattern is determined.
Figure 7B:
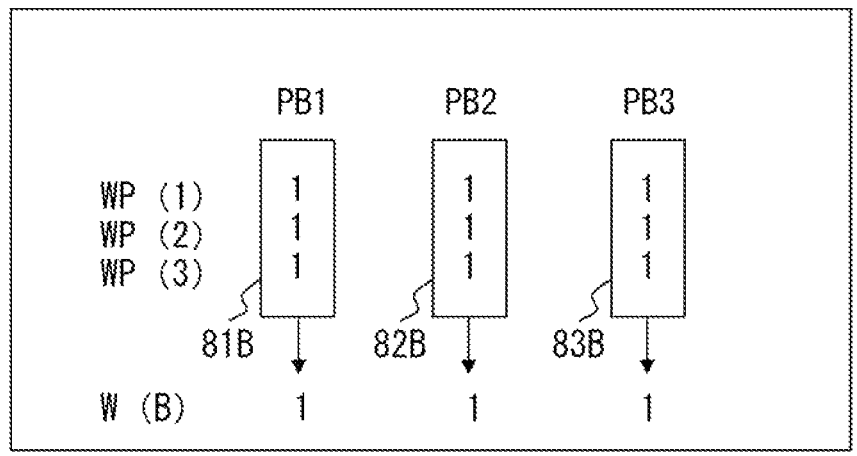
Figure 7D:
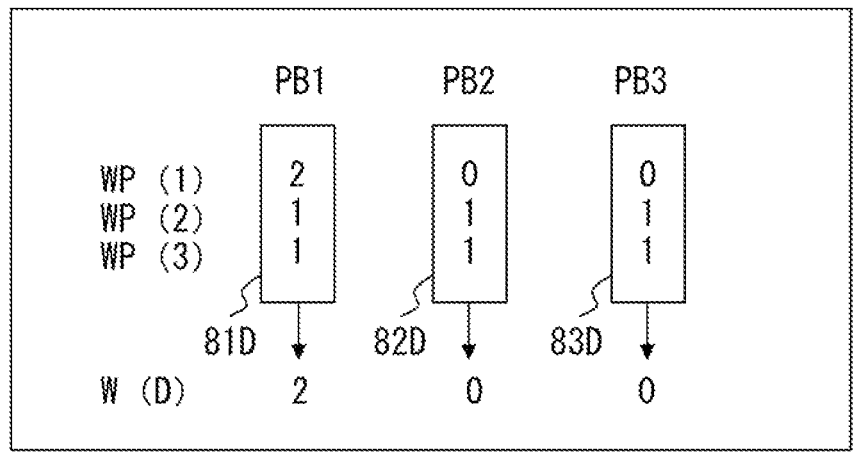

FIG. 4 is a flowchart illustrating an example operation of the controller 20 when a weighting pattern is determined. Here, the operation when the mobile station A reports the received power will be described.

The mobile station A provides the level of the received power received from each of the sectors 101-403 and the sector ID to the base station 10a in pairs. The baseband signal processing unit 15 processes the data received through the antenna 11a and the receiver 14, and the controller 20 obtains the received power (P) and the sector ID from the baseband signal processing unit 15 (step S1).

The controller 20 identifies the sector ID to determine whether the received power is from the communication sector (step S2). Here, the controller 20 determines whether the received power is from the sector 101 in which the mobile station A is located or from the other sectors. The controller may perform this determination with reference to an interference sector table.

FIG. 5 is an example interference sector table. The base station 10 stores an interference sector table in, for example, the ROM 17. In the interference sector table of FIG. 5, the interference sectors when the sector 101 is the communication sector as well as the identifier indicating a priority band used in each sector are recorded. In the example of FIG. 5, the interference sectors are the sectors 102 and 103 and the sectors included in the cells b-d. When the sector ID associated with the received power obtained in step S1 is the sector ID of the communication sector, the controller 20 determines that the received power is obtained from the communication sector, and inputs a value of the received power to the communication sector pattern obtaining unit 40 (step S2). The state comparator 41 compares a communication threshold (Th1) with a level of the received power (step S3).

A smaller level of the received power from the communication sector than a communication threshold indicates that the communication state of a mobile station is worse than the communication state set to a communication threshold. Accordingly, when a level of the received power from the communication sector is smaller than a communication threshold, the pattern determining unit 42 places a higher priority on the priority band that is used in the communication sector (step S4). For example, in order to increase the probability that the priority band 1 will be allocated to the mobile station A, the pattern determining unit 42 sets "2" to the priority of the priority band 1, and sets "0" to the priority of the other priority bands. Note that when placing a higher priority, the pattern determining unit 42 may set any positive integer that is more than "1" as the priority. Also, any number that is smaller than "1" may be set to a band where the priority is to be relatively smaller.

On the other hand, an equal or a larger level of the received power from the communication sector than a communication threshold indicates that the communication state of a mobile station is equal to or better than the communication state set to a communication threshold. In other words, when a level of the received power from the communication sector is equal to or larger than a communication threshold, that mobile station can communicate without changing the communication band allocated to the mobile station. Accordingly, on this occasion, the pattern determining unit 42 places the same priority on all the bands that are used in the communication sector (step S5).

In steps S4 and S5, the pattern determining unit 42 may determine a weighting pattern to be applied from the preliminarily stored weighting patterns (WP-w, WP-x). For example, it is assumed that the pattern determining unit 42 stores the following weighting patterns.

$$WP\text{-}w\text{:}(PB1,PB2,PB3)=(1,1,1)$$

$$WP\text{-}x\text{:}(PB1,PB2,PB3)=(2,0,0)$$

In step S4, the pattern determining unit 42 determines the weighting pattern to be "WP-x" in order to increase the probability that the priority band 1 will be allocated to the mobile station A. On the other hand, in step S5, as the communication state of the mobile station A is good without any change of the band allocation to the mobile station A, the pattern determining unit 42 determines the weighting pattern to be "WP-w".

Once the priority for each of the priority bands 1-3 is determined in step S4 or S5, the pattern determining unit 42 outputs weighting patterns (PB1,PB2,PB3) to the weighting factor calculator 60 together with the sector ID and the level of the received power.

In step S2, when the sector ID is included in the interference sector table, the controller 20 determines that the received power is received from the interference sectors. Then, the controller 20 outputs a value of the received power and the sector ID to the interference sector pattern obtaining unit 50-1. The interference sector pattern obtaining unit 50-1 compares the received power (P) with an interference threshold value (Th2) (step S6).

A larger level of the received power from the interference sectors than an interference threshold value indicates that a mobile station interferes with the other mobile stations located in the interference sectors to a degree larger than the allowable degree. For example, when the band 2 is allocated to the mobile station A and the received power from the sector 102 is larger than an interference threshold value, the mobile station A interferes with the communication in which the band 2 is used in the sector 102. Accordingly, it is desirable that the frequency of the band allocated to the mobile station A be different from that of the priority band of the sector 102. On this occasion, in order to reduce the probability that the band whose frequency is the same as that of the priority band of the interference sector is allocated to the mobile station A, the pattern determining unit 52 places a lower priority on the band whose frequency is the same as that of the priority band of the interference sector (step S7).

A smaller level of the received power from the interference sector than an interference threshold value indicates that a mobile station interferes with the other mobile stations located in the interference sectors to an allowable degree. Accordingly, when a level of the received power from the interference sector is smaller than an interference threshold value, the pattern determining unit 52 places the same priority on all the bands that are used in the communication sectors (step S8).

The pattern determining units 52 (52-1-52-N) change the priority in a similar manner as the pattern determining unit 42. Moreover, for example, the pattern determining unit 52 may select a weighting pattern to be applied from the preliminarily stored weighting patterns. For example, it is assumed that the pattern determining unit 52-1 stores weighting patterns (WP-y, WP-z).

As for the weighting pattern WP-y, the following is assumed:

priority of the band used as a priority band in the communication sector of a mobile station=1;

priority of the band used as a priority band in a sector having a large interference=0; and priority of the band used as a priority band in an interference sector having an allowable interference=2.

Accordingly, the weighting pattern of WP-y is $$WP\text{-}y:(PB1,PB2,PB3)=(1,0,2)$$

in this example. As for WP-z, the weighting pattern is as follows:

$$WP\text{-}z:(PB1,PB2,PB3)=(1,1,1)$$

In step S7, the pattern determining unit 52-1 determines the weighting pattern to be "WP-y" in order to reduce the probability that the band 2 will be allocated to the mobile station A. On the other hand, in step S8, as the interference of the mobile station A with the sector 102 is small without changing the band allocation to the mobile station A, the pattern determining unit 52-1 determines the weighting pattern to be "WP-z". The interference sector pattern obtaining unit 50 also outputs weighting patterns to the weighting factor calculator 60 together with the sector ID and the level of the received power, in a similar manner as the communication sector pattern obtaining unit 40.

When the controller 20 further receives the received power from a next interference sector, the controller 20 inputs data such as a received power to the interference sector pattern obtaining unit 50 that has not processed the received power, such as an interference sector pattern obtaining unit 50-2, and thereby requests the determination of a weighting pattern. In other words, each interference sector pattern obtaining unit outputs one weighting pattern to the weighting factor calculator 60.

FIG. 6 is a diagram illustrating an example method for storing weighting patterns in the buffer 61. In the example of FIG. 6, an example record in the buffer 61 is illustrated when a weighting pattern is selected from the aforementioned four types of weighting patterns of WP-w-WP-z, where the communication threshold and the interference threshold value are −70 dBm and −140 dBm, respectively. Here, FIG. 6 illustrates example weighting patterns obtained when the communication status of the mobile station A with the sector 101 is good and the level of interference of the mobile station A with the mobile stations located in the sectors 102 and 202 is not allowable. In other words, while the mobile station A has a good communication state with the communication sector, the interference with the communications of the sectors 102 and 202 where the priority band is the band 2 exceeds a permissible range, and the interference with the communications of the sectors where the priority band is the band 3 is within a permissible range.

Once a weighting pattern is input to the weighting factor calculator 60, the weighting factor calculator 60 records the sector ID and the received power that were input together with the weighting pattern in the buffer 61. The weighting factor calculator 60 further checks the number of the input weighting patterns. Moreover, the weighting factor calculator 60 may also store the priority bands that are used in the sectors in association with the weighting patterns or the like in the buffer 61 in view of the interference sector table. The weighting factor calculator 60 receives weighting patterns from each of the N number of pattern determining units 52 and the pattern determining unit 42, and the pattern selector 62 is notified when the number of the received weighting patterns has reached "N+1".

Once notification is received from the weighting factor calculator 60, the pattern selector 62 selects a weighting pattern to be used for calculating a weighting factor. Here, it is assumed that in view of the record on the buffer 61, the pattern selector 62 selects one weighting pattern to be used for calculating a weighting factor from the weighting patterns obtained from the sectors that use the same priority band. The pattern selector 62 compares the levels of the received power of the mobile stations among the sectors that use the same priority band, and uses the weighting pattern obtained by using the data from the sector whose value of the received power is largest to calculate a weighting factor. For example, there are four sectors where the priority band is the band 1, i.e., the sectors 101, 201, 301, and 401. If the levels of the received power received at the mobile station A are compared among those four sectors, the received power from the sector 101 is largest. On this occasion, the pattern selector 62 selects (1,1,1) obtained in the sector 101 as a weighting pattern. In a similar manner, the pattern selector 62 selects (1,0,2) obtained in the sector 102 in accordance with a result of comparison among the levels of the received power of the mobile station A from the sectors 102, 202, 302, and 402 where the priority band is the band 2. Among the sectors 103, 203, 303, and 403 where the priority band is the band 3, the received power from the sector 303 is the largest, and (1,1,1) is used for calculating a weighting factor. The pattern selector 62 outputs a weighting pattern used for calculating a weighting factor to the factor calculator 63.

As described above, the pattern selector 62 selects a weighting pattern used for calculating a weighting factor among the weighting patterns selected on the basis of the received power in the sectors. The selected weighting pattern is a weighting pattern that was selected on the basis of the data of the sector at which the mobile station A receives the strongest electric power among the sectors in which the same frequency band is used as a priority band. Accordingly, it can be said that the pattern selector 62 selects the weighting pattern to which the impact of the mobile station A on the communication at the respective priority bands is most strongly reflected, and outputs the selected weighting pattern to the factor calculator 63.

FIGS. 7A-7D are diagrams illustrating an example method for calculating a weighting factor. A method for calculating a weighting factor used for allocating a communication band to the mobile station A will be described with reference to FIG. 7A. The abbreviation "WP(1)" in FIGS. 7A-7D indicates a weighting pattern obtained on the basis of the received power from the sector where the priority band is the band 1. In a similar manner, the abbreviation "WP(2)" indicates a weighting pattern obtained on the basis of the received power from the sector where the priority band is the band 2, and the abbreviation "WP(3)" indicates a weighting pattern obtained on the basis of the received power from the sector where the priority band is the band 3. Moreover, the sign "W" indicates the combination of the weighting factors obtained for the bands, and the alphanumeric character in parentheses indicates the mobile station at which the weighting factor is obtained. For example, the abbreviation "W(A)" indicates the combination in which a weighting factor is calculated for the mobile station A.

From the values of the priority included in the weighting pattern input from the pattern selector 62, the factor calculator 63 obtains the product of the values of the priority for the same band. The factor calculator 63 determines the obtained product of the priority to be the weighting factor of the band to which the priority used in the calculation was allocated. For example, among the weighting factors of the mobile station A, the weighting factor for the band 1 is the product of the PB1 of WP(1), the PB1 of WP(2), and the PB1 of WP(3). Accordingly, the factor calculator 63 determines the product of the values within the rectangle of 81A to be the weighting factor of the band 1 for the mobile station A. In a similar manner, the factor calculator 63 determines the product of the values within the rectangle of 82A to be the weighting factor of the band 2, and determines the product of the values within the rectangle of 83A to be the weighting factor of the band 3. As a result, the factor calculator 63 calculates the combination of the weighting factors for the mobile station A, i.e., W(A)=(1,0,2).

In the calculation result of the factor calculator 63, the weighting factor of the band 2 in which the level of interference exceeds a permissible range is "0", and the weighing factor of the band 3 in which the level of interference is below a permissible range is "2". Accordingly, the band 3 is more likely to be allocated to the mobile station A than the band 2.

Once the weighting factor for the mobile station A is obtained, the controller 20 calculates the weighting factors for the other mobile stations. For example, the mobile station B has a good communication status in a communication sector, and does not cause interference larger than a permissible range to either the sector where the priority band is the band 2 or the sector where the priority band is the band 3. Accordingly, the weighting patterns selected by the pattern selector 62 for the mobile station B are as illustrated in WP(1), WP(2), and WP(3) of FIG. 7B. The factor calculator 63 calculates the product of the values within the rectangle of 81B, the product of the values within the rectangle of 82B, and the product of the values within the rectangle of 83B as a weighting factor of the band 1, a weighting factor of the band 2, and a weighting factor of the band 3, respectively. As a result, the factor calculator 63 calculates the combination of the weighting factors for the mobile station B, i.e., W(B)=(1,1,1).

The mobile station C has a poor communication status in a communication sector. Moreover, the interference with the communication in which the band 2 is the priority band is small, but the interference is larger than a permissible range with the communication in which the band 3 is the priority band. Accordingly, the weighting patterns selected by the pattern selector 62 for the mobile station C are as illustrated in WP (1), WP(2), and WP(3) of FIG. 7C. The factor calculator 63 calculates the combination of the weighting factors for the mobile station C, i.e., W (C)=(2, 0, 0), on the basis of the product of the values within the rectangles of 81C-83C. In the mobile station C, the weighting factor for the band 1 that is the priority band of the communication sector 101 is larger than those of the other bands such that the communication status in a communication sector will be improved.

The mobile station D has a poor communication status in a communication sector, but the level of interference with the communication in which either the band 2 or the band 3 is used is no larger than a permissible degree. Accordingly, the weighting patterns selected by the pattern selector 62 for the mobile station D are as illustrated in WP (1), WP (2), and WP (3) of FIG. 7D. The factor calculator 63 calculates the combination of the weighting factors for the mobile station D, i.e., W(D)=(2,0,0), on the basis of the product of the values within the rectangles of 81D-83D. In the mobile station D, in a similar manner as the mobile station C, the weighting factor for the band 1 that is the priority band of the communication sector 101 is larger than those of the other bands such that the communication status in a communication sector will be improved.

The factor calculator 63 outputs the calculated weighting factors to the allocation unit 70. The allocation unit 70 allocates a communication band to each mobile station by using a scheduling factor input from the scheduling factor calculator 30 and a weighting factor.

The allocation unit 70 calculates the product of a weighting factor and a scheduling factor of the bands for each mobile station. For example, the weighting factor is "1" and the scheduling factor is F(A,1) for the band 1 of the mobile station A, and the allocation unit 70 calculates F(A,1). The weighting factors for the mobile station A in the band 2 and band 3 are respectively "0" and "2", and in a similar manner, the allocation unit 70 obtains a calculation result of "0" and 2F(A,3) for the band 2 and band 3, respectively. The allocation unit 70 calculates the product of the weighting factors and scheduling factors for the other mobile stations in a similar manner, and stores the obtained values in association with the bands for each mobile station. For example, the allocation unit 70 may store the products of the weighting factors and scheduling factors in a table as illustrated in FIG. 8. The table of FIG. 8 may be stored by the allocation unit 70, or be written to the RAM 16 or the like by the allocation unit 70.

The allocation unit 70 detects a mobile station for each band in which the product of the weighting factor and the scheduling factor is the largest, and allocates the frequency of that band to the detected mobile station. For example, in the example of FIG. 8, the allocation unit 70 compares the four values of F(A,1), F(B,1), 2F(C,1), and 2F(D,1) for the band 1. Here, assuming that 2F (C, 1) is the largest value among the values to be compared, the allocation unit 70 allocates the band 1 to the mobile station C. In the band 2, the product of the weighting factors and the scheduling factors is "0" for any of the mobile stations A, C, and D, and the allocation unit 70 allocates the band 2 to the mobile station B. In the band 3, the product of the weighting factor and the scheduling factor is "0" for the mobile stations C and D, and the allocation unit 70 compares 2F (A, 3) with F (B, 3) in size. When the value of 2F (A, 3) is larger than that of F(B,3), the allocation unit 70 allocates the band 3 to the mobile station A.

FIG. 9 illustrates an example result of allocating a communication band to mobile stations. In addition to the result of allocating a communication band, FIG. 9 also illustrates the communication status of mobile stations and the level of interference with the mobile stations that use the other bands. Here, "sector x02" indicates a sector that uses the band 2 as the priority band, and "sector x03" indicates a sector that uses the band 3 as the priority band.

In the example of FIG. 9, the mobile stations A and B have a good communication status with a communication sector. Accordingly, it is desirable for the mobile stations A and B to communicate by using a different band from the band 1 that is the priority band of the sector 101 such that the priority band of the communication sector will be allocated to a mobile station in which the communication status is poor. Regarding the mobile station A, as the interference with a mobile station using the band 2 for communication in the interference sector is large, it is desirable that the band (band 2) not be allocated thereto. Regarding the mobile stations C and D, it is desirable that the band 1 that becomes the priority band of the communication sector 101 be allocated thereto such that the communication state with the communication sector will be improved. In the example allocation illustrated in FIG. 9, a desired band that each of the mobile stations A-C should use is allocated to each of the mobile stations A-C.

Accordingly, the interference between sectors can be reduced due to the scheduling performed by the base station 10. Further, regarding a mobile station with a poor communication state, the priority band of the communication sector is allocated thereto in order to improve the communication status. The interference between sectors has been described in the above; however, in the case of a base station 10 that forms an omnicell, the interference between cells is reduced due to the scheduling performed by the base station 10.

Moreover, the example of FIG. 9 shows cases in which one band is allocated to one mobile station; however, one band may be allocated to any number of mobile stations depending on the implementation. For example, no band is allocated to the mobile station D, but if one band is allocated to two mobile stations, the band 1 may be allocated to the mobile station D. This may happen due to the time multiplexing.

Figure 10:
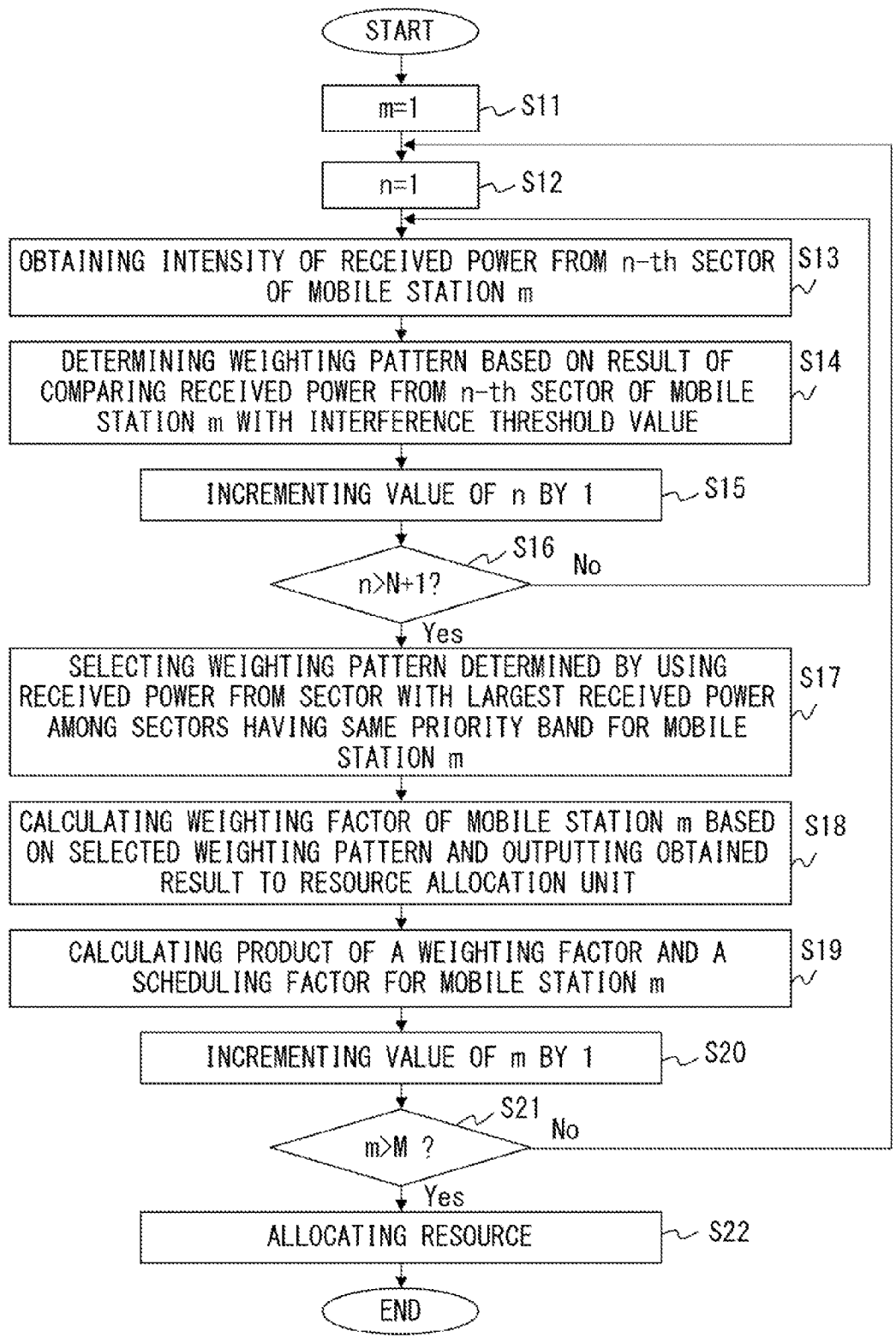
FIG. 10 is a flowchart describing example operations performed when a controller allocates a communication band.

FIG. 10 is a flowchart describing example operations performed when the controller 20 allocates a communication band to a mobile station located in a certain sector. In the flowchart of FIG. 10, two variables of "m" and "n" are used. The variable "m" is used for calculating the number of mobile stations that the allocation unit 70 calculated the product of a scheduling factor and a weighting factor for, and the variable "n" is used for calculating the number of the sectors for which a weighting pattern is selected. The "M" indicates the number of the mobile stations that are located in the sector to which a communication band is allocated. It is assumed that the controller 20 knows the value of M when the allocation of a communication band begins.

When the allocation unit 70 is notified that the controller 20 begins allocating a communication band, the allocation unit 70 sets the value of m to "1" (step S11). When the weighting factor calculator 60 is notified that the controller 20 begins allocating a communication band, the weighting factor calculator 60 sets the value of n to "1" (step S12). The communication sector pattern obtaining unit 40 or one of the interference sector pattern obtaining units 50-1-50-N obtains the intensity of the received power from the n-th sector for the m-th mobile station (step S13). The cases in which the intensity of the received power from the communication sector is obtained at first are described in the above-described example, but as illustrated in the flowchart of FIG. 10, the controller 20 may obtain the intensity of the received power from each sector in any order. Here, the controller 20 inputs the intensity of the received power from a communication sector to the communication sector pattern obtaining unit 40, and inputs the intensity of the received power from an interference sector to one of the interference sector pattern obtaining units 50-1-50-N.

When the received power is input to the communication sector pattern obtaining unit 40, the communication sector pattern obtaining unit 40 compares the intensity of the input received power with a communication threshold to determine a weighting pattern on the basis of the comparison result. On the other hand, when the intensity of the received power is input to the interference sector pattern obtaining unit 50, the interference sector pattern obtaining unit 50 determines a weighting pattern on the basis of a result of comparing the input received power with an interference threshold value (step S14). When the weighting pattern is input to the weighting factor calculator 60, the weighting factor calculator 60 increments the value of n by 1, and checks if the value of n is larger than that of N+1 (steps S15, S16). The steps S13-S16 are repeated until the value of n becomes larger than that of N+1. When the value of n becomes larger than the value of N+1, a weighting pattern has been determined for all the sectors for a mobile station m. Accordingly, the pattern selector 62 selects the weighting pattern determined by using the received power from the sector with the largest received power from among the sectors having the same priority band (step S17). The factor calculator 63 calculates a weighting factor for allocating a communication band to the mobile station m on the basis of the weighting pattern selected by the pattern selector 62 (step S18). The allocation unit 70 obtains a scheduling factor for the mobile station m from the scheduling factor calculator 30. Further, the allocation unit 70 calculates the product of a weighting factor and a scheduling factor for each band (step S19). When the allocation unit 70 completes the calculation, the allocation unit 70 increments the value of m by 1 (step S20). The allocation unit 70 may increment the value of m after writing a multiplication result into the RAM 16. The allocation unit 70 compares the value of m with that of M, and notifies the controller 20 when the value of m is not larger than that of M. Once the notification from the allocation unit 70 is received, the controller 20 repeats steps S12-S21 (step S21). Once the value of m has become larger than that of M, the allocation unit 70 compares the result of multiplying a weighting factor and a scheduling factor for each band, and applies a communication band to a mobile station in accordance with a value of the multiplication result (step S22).

As described above, the interference with an interference sector may easily be reduced by adopting the base station 10 according to the present embodiment. Moreover, the communication state with a communication sector is improved to a state better than the state expressed in a communication threshold. Accordingly, the throughput of the system is improved.

<The Second Embodiment>

The base station 10 according to the second embodiment is provided with an interference threshold value calculator 53, and the communication sector pattern obtaining unit 40 is provided with the communication threshold calculator 43. In the second embodiment, the communication threshold calculator 43 reports a communication threshold in response to a request from the state comparator 41. Moreover, the interference threshold value calculator 53 reports an interference threshold value in response to a request from the interference comparators 51-1-51-N. Accordingly, the state comparator 41 and the interference comparators 51-1-51-N do not store the communication threshold or the interference threshold value.

The communication threshold calculator 43 changes the value of a communication threshold on the basis of the size of the value of a state parameter. Accordingly, even if the state parameter of a mobile station fluctuates depending on environmental changes or the like, the base station 10 according to the second embodiment may change the communication threshold in response to the fluctuation, and may determine a weighting pattern on the basis of the changed communication threshold.

Hereinafter, example operations of the communication threshold calculator 43 will be described. The communication threshold calculator 43 obtains the result of comparing a communication threshold and a state parameter from the state comparator 41. The communication threshold calculator 43 varies Th1 according to equation (2) when the state parameter is smaller than the communication threshold Th1, and varies Th1 according to equation (3) when the state parameter is larger than the communication threshold Th1.

$$Th1 = Th1 - \alpha(1-X) \quad (2)$$

$$Th1 = Th1 + \alpha X \quad (3)$$

Here, "$\alpha$" is a constant expressing the range in which the communication threshold may be varied. "$X$" is a constant related to the distribution of a state parameter with reference to a communication threshold, which is a positive value smaller than 1. In a sector, when the rate of mobile stations of which the state parameter are larger than a communication threshold is X and the rate of mobile stations of which the state parameters are smaller than a communication threshold is (1−X), the communication threshold converges to the Th1.

The interference threshold value calculator 53 also operates in a similar manner as the communication threshold calculator 43. The interference threshold value calculator 53 varies an interference threshold value Th2 according to equation (4) when the interference threshold value Th2 is larger than the interference parameter, and varies the interference threshold value Th2 according to equation (5) when the interference threshold value Th2 is smaller than the interference parameter.

$$Th2 = Th2 - \beta(1-Y) \quad (4)$$

$$Th2 = Th2 + \beta Y \quad (5)$$

Here, "$\beta$" is a constant expressing the range in which the interference threshold value may be varied. "$Y$" is a constant related to the distribution of an interference parameter with reference to an interference threshold value, which is a positive value smaller than 1. The interference threshold value calculator 53 varies the interference threshold value by using the equation (4) or (5) every time N number of comparison results is received from each of the interference comparators 51-1-51-N.

Note that the above-described method is just an example method for calculating a threshold value, and the method for calculation may be arbitrarily changed depending on the implementation.

Figure 11:
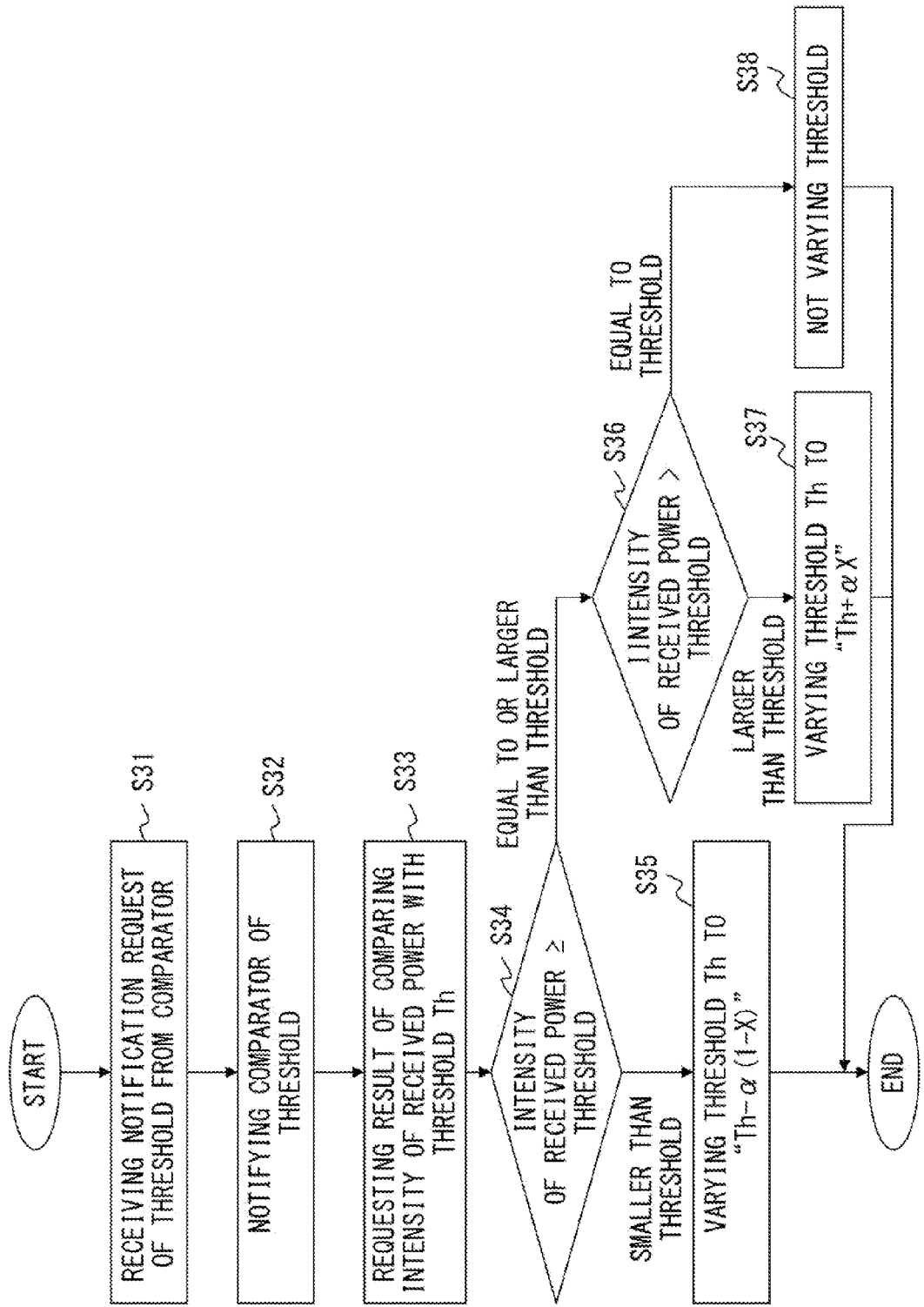
FIG. 11 is a flowchart describing an example method for changing a threshold value.

FIG. 11 is a flowchart describing an example method for changing a threshold value. The cases in which the state parameter is a received power from a communication sector will be described with reference to FIG. 11, and the interference threshold value calculator 53 varies a threshold value by using a similar type of calculation.

The communication threshold calculator 43 receives the notification request of a communication threshold from the state comparator 41 (step S31). The communication threshold calculator 43 notifies the state comparator 41 of a communication threshold, and requests a result of comparing the received power with the communication threshold to the state comparator 41 (steps S32, S33). When the intensity of the received power is smaller than the communication threshold, the communication threshold calculator 43 varies the communication threshold in accordance with the equation (4) (steps S34, S35). On the other hand, when the intensity of the received power is larger than the communication threshold, the communication threshold calculator 43 varies the communication threshold in accordance with the equation (5) (steps S34, S36, S37). When the level of the received power matches the value of the communication threshold, the communication threshold calculator 43 does not vary the threshold value (steps S36, S38).

The base station 10 provided with the communication threshold calculator 43 and the interference threshold value calculator 53 has been described in the above, but the base station 10 may be provided with either the communication threshold calculator 43 or the interference threshold value calculator 53.

As described above, in cases where the base station can vary a communication threshold or an interference threshold value, the base station 10 can autonomously vary a threshold value in response to environmental changes after the base station 10 is arranged. For this reason, the base station 10 can appropriately allocate a communication band to a mobile station even if there are environmental changes.

<The Third Embodiment>

In the third embodiment, an example variation of the band allocation to a mobile station in which the communication status is good and the interference with the communication of a mobile station located in another sector is large will be described. In the third embodiment, it is assumed that the band allocated in sectors is divided into four bands 1-4. The priority band used in sectors 101, 201, 301, and 401 is the band 1. Moreover, the band 2 is used as the priority band in sectors 102, 202, 302, and 402, and the band 3 is used as the priority band in sectors 103, 203, 303, and 403. The band 4 is not used as the priority band in any sector.

In a mobile station E (not illustrated) located in the sector 101, it is assumed that the communication status is good. Moreover, it is assumed that the interference of the mobile station E with the sectors 102, 202, 302, and 402 as well as the sectors 103, 203, 303, and 403 exceeds the allowable degree.

The scheduling factor calculator 30 calculates a scheduling factor for each of the bands 1-4 of the mobile stations. The method for calculating a scheduling factor or outputting a result of the calculation is the same as in the first embodiment.

The communication sector pattern obtaining unit 40 determines weighting patterns (PB1, PB2, PB3, and PB4) that include the priority for the bands 1-4 to output the determined weighting patterns to the weighting factor calculator 60. For example, as the mobile station E has a good communication state with a communication sector, it is not considered to be desirable to change the band allocation according to the comparison result obtained at the state comparator 41. Accordingly, the pattern determining unit 42 outputs a weighting pattern in which the priority for each of the bands 1-4 is 1.

The interference sector pattern obtaining unit 50 also determines weighting patterns that include the priority for the bands 1-4 to output the determined weighting patterns to the weighting factor calculator 60. Note that the priority of a fourth priority band is determined to be 1 by the pattern determining unit 52.

The mobile station E has a large interference with the communication of a mobile station that uses the band 2 as the priority band and is located in an interference sector. For this reason, the pattern determining unit 52 reduces the priority of the band 2 so as to minimize the likelihood that the band 2 will be assigned to the mobile station E. For example, it is assumed that the pattern determining unit 52 assigns the weighting patterns of (1,0,2,1) on the basis of the received power received by the mobile station from the sector 102.

The pattern determining unit 52 also reduces the priority of the band 3 on the basis of the received power from a sector where the priority band is the band 3 so as to minimize the likelihood that the band 3 will be assigned to the mobile station E. For example, it is assumed that the pattern determining unit 52 assigns the weighting patterns of (1,2,0,1) on the basis of the received power received by the mobile station from the sector 103.

Assuming that the weighting pattern selected by the pattern selector 62 is obtained on the basis of the received power of the sectors 101, 102, and 103, the weighting patterns used for calculating a weighting factor are as illustrated in FIG. 12. The factor calculator 63 obtains a weighting factor for each band by multiplying the values of priority within the rectangles of 81E-84E. Accordingly, the weighting factor for the mobile station E is (1,0,0,1).

The allocation unit 70 allocates a communication band on the basis of the multiplication result of a weighting factor and a scheduling factor in a similar manner as in the first embodiment. As the weighting factors for the mobile station E are 0 for the bands 2 and 3 in FIG. 12, the band which is the same as the priority band used in a sector in which interference is caused is not allocated to the mobile station E. Accordingly, the level of interference of the mobile station E with a mobile station that uses the priority band for the communication in the sector 102 or 103 can be reduced. As the weighting factor for the mobile station E is 1 for the bands 1 and 4, the bands 1 and 4 may be allocated to the mobile station E. Given that the band 4 is allocated to the mobile station E but the band 1 is not, it is likely that the band 1 is allocated to a mobile station having a poor communication state with the sector 101. In this case, the communication state of the mobile station to which the band 1 is allocated is improved, and the mobile station E can communicate with a communication sector by using the band 4 while the interference from the mobile station E is prevented; thereby, the throughput of the whole system is improved. In other words, the base station 10 may improve the throughput of the whole system by allocating a communication band according to the third embodiment in which the band 4, which is not being used as the priority band in any sector, is used.

Moreover, if the allocation unit 70 is configured not to allocate two or more bands to each mobile station, it becomes easier to improve the throughput of the system by using the band 4. In this case, if the band 4 is allocated to the mobile station E, the band 1 will not be allocated to the mobile station E. For this reason, the chances of the band 1 being allocated to the mobile station E can be reduced by dividing the band into four, rather than three, such that either the band 1 or the band 4 will be allocated to a mobile station. Accordingly, the chances of the band 1, which is the priority band, being allocated to a mobile station having a poor communication status in a communication sector can be increased.

<The Fourth Embodiment>

Also in the fourth embodiment, the variation of the band allocation to the mobile station E, which has a good communication status and large interference with the communication of a mobile station located in another sector, will be described. The base station 10 according to the fourth embodiment allocates a band used as the priority band in an interference sector to the mobile station E, and notifies the mobile station E that the transmission power used by the mobile station E should be reduced. Here, an interference parameter is the level of the power that the mobile station E sends to an interference sector. Supposing that the transmission power of a base station, the transmission power of the mobile station E, and the received power that the mobile station E received from an interference sector are respectively Pbs, Pms, and Prx, the interference parameter is expressed as Prx+Pms−Pbs.

In the fourth embodiment, the interference comparators 51-1-51-N calculate the difference between an interference parameter and an interference threshold value by using the equation (interference parameter)−(interference threshold value) when comparing the interference parameter with the interference threshold value. The interference comparators 51-1-51-N report the difference between an interference parameter and an interference threshold value to the weighting factor calculator 60 via the pattern determining units 52-1-52-N. The weighting factor calculator 60 stores the reported value of the difference to the buffer 61. FIG. 13 illustrates an example table in which the difference between an interference parameter and an interference threshold value is stored. Note that FIG. 13 is presented by way of example, and the information included in a table may vary depending on the implementation. For example, the weighting factor calculator 60 may store a positive value obtained in the equation (interference parameter)−(interference threshold value) in a table.

The selection or determination of a weighting pattern is performed in a similar manner as in the first embodiment. Here, it is assumed that the selected weighting pattern is as follows.

$WP(1)=(1,1,1)$ $WP(2)=(1,0,2)$ $WP(3)=(1,2,0)$

If weighting factor calculator 60 calculates a weighting factor by using the selected weighting pattern in a similar manner as in the first embodiment, the weighting factor becomes (1,0,0). Next, the weighting factor calculator 60 refers to the buffer 61 to detect a band used in the interference sector having the largest difference between an interference parameter and an interference threshold value, and changes the weighting factor designated by the detected band to 1. For example, in case of FIG. 13, in the sector 102, the difference between the interference parameter and an interference threshold value is 10 dBm, which is the largest. Accordingly, the weighting factor calculator 60 changes the weighting factor of the band 2 to "1", and outputs the changed weighting factor (1,1,0) to the allocation unit 70. Further, the weighting factor calculator 60 notifies the allocation unit 70 of the change in the weighting factor of the band 2 as well as of the largest value in the difference between an interference parameter and an interference threshold value.

The allocation unit 70 stores the identifier of a band whose weighting factor has been changed and the largest value (Δmax) in the difference between an interference parameter and an interference threshold value together with the identifier of a mobile station in which the weighting factor is used. In the following description, the identifier of a mobile station, the identifier of a band in which the weighting factor has been changed, and a value of Δmax maybe described as "power reduction band information". For example, in the example of FIG. 13, the "power reduction band information" includes the information that the weighting factor of the band 2 for the mobile station E has been changed and the information that the difference between an interference parameter and an interference threshold value is 10 dBm. The allocation unit 70 allocates a communication band to a mobile station in a similar manner as in the first embodiment by using a weighting factor and a scheduling factor.

The allocation unit 70 checks whether the identifier of the band allocated to a mobile station is recorded in the power reduction band information. When the combination of a mobile station and a band allocated to the mobile station matches with the record in the power reduction band information, the allocation unit 70 obtains a value of Δmax that is recorded in the power reduction band information together with the allocation of a communication band. The base station 10 notifies the mobile station of the allocation of a communication band, and requests to reduce the transmission power by the value of Δmax. When the value of Δmax is negative, the power control is not performed.

For example, the allocation unit 70 checks whether the band 2 is allocated to the mobile station E. If the band 2 is allocated to the mobile station E, the base station 10 requests that mobile station E reduce the transmission power by 10 dBm. On this occasion, the mobile station E reduces the transmission power by 10 dBm when transmitting data to the communication sector 101 by using the band 2. Accordingly, the interference of the mobile station E with the communication performed by using the band 2 in the sector 102 or the like is reduced to an allowable degree. The band 3 is not allocated to the mobile station E, and thus the mobile station E does not interfere with the communication in which the band 3 is used.

In the first embodiment, the mobile station E has a large interference with both the band 2 and the band 3, and thus the band 1 is allocated to the mobile station E. Having said that, the mobile station E has a good communication state, and thus it is desired that the band 1 be allocated to a mobile station that has a poor communication status in the sector 101 rather than to the mobile station E. According to the present embodiment, the weighting factor of the mobile station E is "1" for the band 1 and the band 2, and the band 1 and the band 2 may be allocated to the mobile station E. Accordingly, when the band 1 is not allocated to the mobile station E, the band may be allocated to a mobile station that has a poor communication status in the sector 101.

Figure 14B:
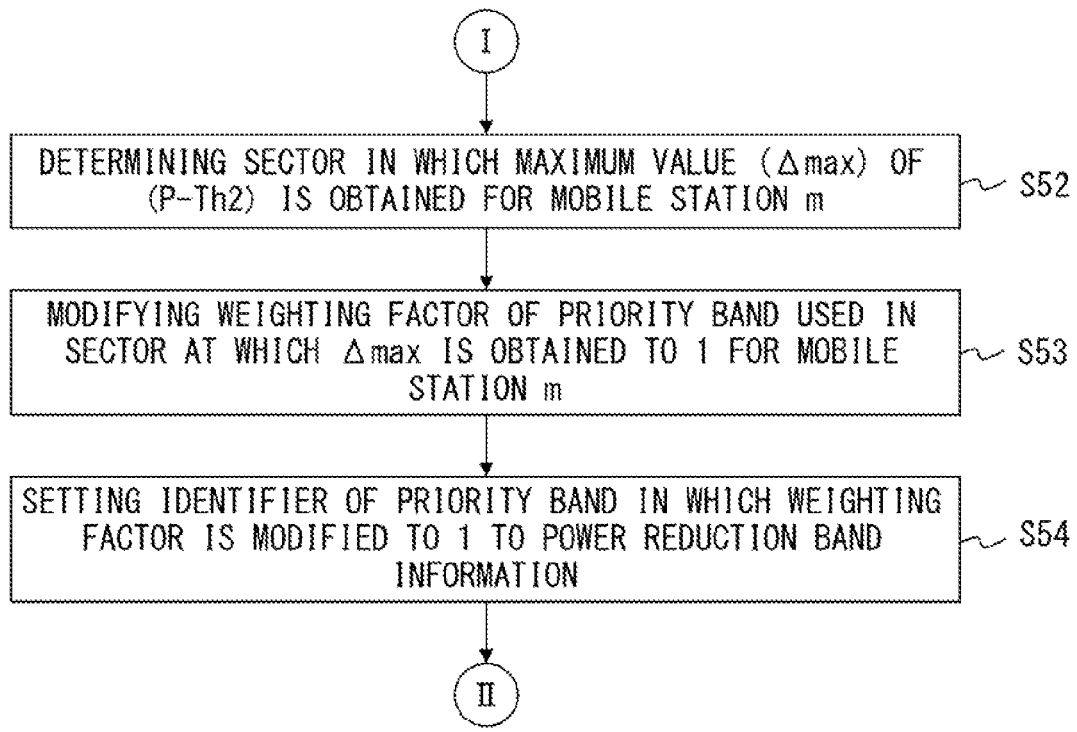
FIG. 14B is a flowchart illustrating example operations of abase station according to the fourth embodiment.
Figure 14C:
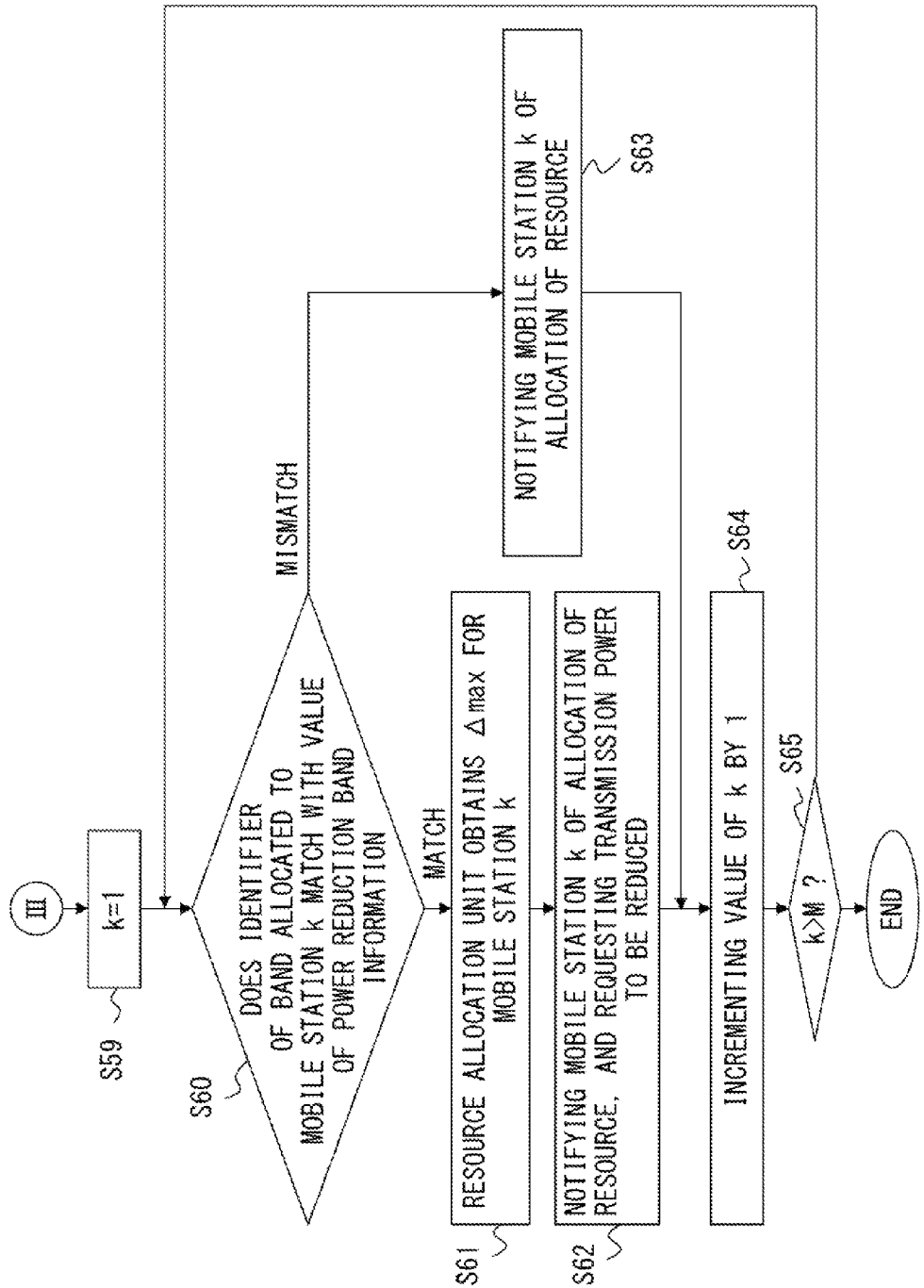
FIG. 14C is a flowchart illustrating example operations of a base station according to the fourth embodiment.

FIG. 14A-14C is a flowchart illustrating example operations of the base station 10 according to the fourth embodiment. In the flowchart of FIG. 14C, a variable k is used for calculating the number of mobile stations in which the identifier of the band included in the power reduction band information is checked against the identifier of the allocated band.

When notified by the controller 20 that the allocation of a communication band has started, the allocation unit 70 sets the value of m to 1, and initializes the power reduction band information (steps S41, S42). When notified that the allocation of a communication band has started, the weighting factor calculator 60 sets the value of n to 1 (step S43). The way in which the pattern determining unit 42 and the pattern determining unit 52 determines a weighting pattern is similar to the steps S13 and S14 described with respect to FIG. 10 (steps S44, S45). The interference comparator 51 calculates a difference between the received power from an interference sector and an interference threshold value (step S46). In the operations of FIG. 14A, the state comparator 41 also calculates a difference between the received power from a communication sector and a communication threshold, but there is a possible variation in which the step S46 is performed when the received power from an interference sector is obtained. For example, there is a possible variation in which the step S46 is performed when the received power from an interference sector is obtained after checking whether the received power obtained in the step S44 is the received power from the interference sector. Once a weighting pattern is input, the weighting factor calculator 60 increments the value of n by 1, and checks whether the value of n is larger than N+1 (steps S47, S48). The operations of the steps S44-S48 are repeated until the value of n becomes larger than N+1.

When the value of n becomes larger than N+1, the pattern selector 62 selects a weighting pattern in a similar manner as the steps S17 and S18 of FIG. 10, and calculates a weighting factor (steps S49, S50). Next, the weighting factor calculator 60 determines whether a weighting factor is changed. Here, it is assumed that a weighting factor is changed when the weighting factor of the priority band of a communication sector is 1 and the coefficient of the priority band of an interference sector is 0. For example, the weighting factor calculator 60 checks whether the calculated weighting factor is (1,0,0) (step S51).

FIG. 14B is a flowchart describing the operations of the controller 20 when a weighting factor is changed. When a weighting factor is changed, the weighting factor calculator 60 determines a sector in which the maximum value Δmax of the difference between the received power from an interference sector and an interference threshold value is obtained (step S52). The weighting factor calculator 60 modifies the weighting factor of the priority band used in the sector in which the Δmax is obtained to 1 (step S53). The factor calculator 63 outputs the modified weighting factor to the allocation unit 70. The allocation unit 70 sets the identifier of the modified band, the identifier of a mobile station, and the value of Δmax to the power reduction band information (step S54). On the other hand, when the weighting factor is not modified, the factor calculator 63 outputs the calculated weighting factors to the allocation unit 70.

In a similar manner as in steps S19 and S20, the allocation unit 70 calculates the result of multiplying a weighting factor and a scheduling factor for the mobile station m, and increments the value of m by 1 (steps S55, S56). The allocation unit 70 compares the value of m with that of M, and notifies the controller 20 if the value of m is not larger than that of M. Once notification is received from the allocation unit 70, the controller 20 repeats steps S42-S57 (step S57). Once the value of m has become larger than that of M, the allocation unit 70 compares the result of multiplying a weighting factor and a scheduling factor for each band, and applies a communication band to a mobile station in accordance with a value of the multiplication result (step S58).

FIG. 14C illustrates the processes of steps S59-S65. The allocation unit 70 sets the value of k to 1 (step S59). Next, the allocation unit 70 checks whether the identifier of the band allocated to the mobile station k matches with the identifier of the band included in the power reduction band information (step S60). When they match, the allocation unit 70 obtains the Δmax included in the power reduction band information for the mobile station k (step S61). The base station 10 notifies the mobile station k of the allocation of the communication band, and requests the transmission power to be reduced by the value of Δmax (step S62). On the other hand, when the allocation unit 70 determines that the identifier of the band allocated to the mobile station k does not match with the identifier of the band included in the power reduction band information, the base station 10 notifies the mobile station k of the allocation of the communication band (step S63). After that, the allocation unit 70 increments the value of k by 1, and compares the value of k with that of M (steps S64, S65). As long as the value of k is equal to or smaller than that of M, the base station 10 repeats the steps S60-S65. Once the value of k becomes larger than that of M, the base station 10 determines that the allocation of the communication band to the mobile station is complete, and ends the allocation process.

It is to be noted that the present invention is not limited to the above-described embodiments, but may be modified in various ways. Some examples of such modifications will be described below.

The interference sector table illustrated in FIG. 5 is just an example, and the table may be modified depending on the implementation. For example, the interference sector table may record other elements of information together therein, or may not include the information of the priority band. Moreover, the example in which the interference sector table is fixedly recorded on a ROM is described above, but when the list of interference sectors or the priority band in the interference sectors are changed, the interference sector table may be rewritten.

The base station 10 provided with N number of interference sector pattern obtaining units 50 has been described above, but a processing device provided with only one interference sector pattern obtaining unit 50 may be used as a base station 10. In this case, the interference sector pattern obtaining unit 50 determines the weighting patterns of all the interference sectors by determining a weighting pattern N times.

The first embodiment or the second embodiment may be implemented in combination with the third embodiment or the fourth embodiment.

When level of the path-loss caused between a base station forming a sector and a mobile station is used as a state parameter or an interference parameter, the path-loss may be calculated by using any known calculation method. Note that the path-loss is calculated in each the mobile station, and the base station 10 is notified of a value of the path-loss. Here, in cases where the path-loss is used as a state parameter, a larger path-loss value than communication threshold value indicates that a communication state is worse than the communication state required for that mobile station. Moreover, in cases where the interference parameter is the path-loss value, a smaller value of an interference parameter than an interference threshold value indicates that the level of interference of that mobile station with an interference sector is unacceptably large.

The distance between a base station forming a sector and a mobile station may be used as a state parameter and an interference parameter. In such cases, the distance may be calculated by using the transmission interval of a reference signal. For example, it is assumed that the base station transmits a downstream reference signal to a mobile station at a certain time (t0). On the other hand, it is assumed that when a certain period of time (Toff) has passed after a reference signal is transmitted from a base station, the mobile station transmits an upstream reference signal to a base station. Accordingly, the length of time (ΔT) used for the propagation of a radio wave between a mobile station and a base station is calculated by equation (6). If the propagation velocity V of a radio wave is used, then the distance between a base station and a mobile station is calculated by equation (7).

$$\Delta T = (t1 - t0 - \textit{Toff})/2 \tag{6}$$

$$d = \Delta T/V \tag{7}$$

Here, if two or more reference signals are received via a multipath propagation path, the signal received earliest is calculated by the equations (6) and (7).

In cases where the distance from a base station is used as a state parameter, a larger value of the distance than that of a communication threshold indicates that a communication state is worse than the communication state required for that mobile station. Moreover, in cases where the distance from the base station 10 is used as an interference parameter, a smaller value of an interference parameter than an interference threshold value indicates that the level of interference of that mobile station with an interference sector is unacceptably large.

The received power in an interference sector may be used as a state parameter and an interference parameter as described in the fourth embodiment.

Although the pattern selector 62 selects a weighting pattern for calculating a weighting factor in the previously described embodiment, a weighting factor may be obtained by using all the weighting patterns obtained from the communication sector pattern obtaining unit 40 and the interference sector pattern obtaining unit 50. In such cases, the factor calculator 63 may read the values of weighting factors equal to or larger than 1 as "2", and outputs the values of "2" to the allocation unit 70. In cases where all the weighting patterns are used for calculating a weighting factor, the base station 10 may not be provided with a pattern selector 62.

Furthermore, all of or some of the scheduling factor calculator 30, the communication sector pattern obtaining unit 40, the interference sector pattern obtaining unit 50, the interference threshold value calculator 53, the weighting factor calculator 60, and the allocation unit 70 maybe realized as software. In the cases of realizing some of or all of those elements by software, the base station 10 is provided with a Central Processing Unit (CPU). The ROM. 17 stores programs (not illustrated), and the programs include a scheduling factor calculating module, a communication sector pattern obtaining module, an interference sector pattern obtaining module, a threshold value calculating module, a weighting factor calculating module, and allocating module. The CPU functions as a controller 20 by executing the programs.

As described above, the throughput of a radio communication system is improved due to embodiments including the above-described embodiments 1-4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a demonstration of superior or inferior aspects of the invention. Although the embodiments of the present inventions have been described in detail, it should be understood that various changes, substitutions, and alterations could be made hereto without departing from the spirit and scope of the invention.

What is claimed is:

1. A base station device used in a system in which a first band is allocated on a priority basis to a first mobile station located in a first region, and in which a second band is allocated on a priority basis to a second mobile station located in a second region, the base station device comprising:
   a receiver to receive
      an interference parameter indicating a level of interference caused by the first mobile station in communications of the second mobile station and
      a state parameter representing a communication state of the first mobile station;
   an interference comparator to compare the interference parameter with a predetermined interference threshold value;
   a state comparator to compare the state parameter with a predetermined communication threshold;
   an allocating factor calculator to calculate an allocating factor used for allocating the communication band;
   a weighting factor calculator to calculate a weighting factor for weighting the allocating factor;
   an allocation unit to allocate each communication band to a mobile station having a largest product of the allocating factor and the weighting factor; and
   a transmitter to transmit information of an allocated band to the first mobile station; wherein
   the weighting factor calculator increases a first weighting factor used for allocating the first band to the first mobile station when a level of a communication state represented by the state parameter is smaller than a level of a communication state represented by the communication threshold value, and
   the weighting factor calculator reduces a second weighting factor used for allocating the second band to the first mobile station when a level of interference represented by the interference parameter is larger than a level of interference represented by the interference threshold value, and a level of a communication state represented by the state parameter is larger than a level of a communication state represented by the communication threshold value.

2. The base station device according to claim 1, further comprising:
   a first pattern determining unit to determine a first weighting pattern in which a first band priority indicating a priority of allocating the first band to the first mobile station is larger than a second band priority indicating a priority of allocating the second band to the first mobile station when the level of a communication state represented by the state parameter is smaller than the level of a communication state represented by the communication threshold; and
   a second pattern determining unit to determine a second weighting pattern in which the second band priority is smaller than the first band priority when the level of interference represented by the interference parameter is larger than the level of interference represented by the interference threshold value, wherein
   the weighting factor calculator calculates a weighting factor for allocating the first band as a product of the first band priority included in the first weighting pattern and the second weighting pattern, and calculates a weighting factor used for allocating the second band as a product of the second band priority included in the first weighting pattern and the second weighting pattern.

3. The base station device according to claim 1, further comprising an interference threshold value calculator to calculate the interference threshold value, and to output the interference threshold value calculated at a request to the interference comparator, wherein
   when the interference parameter is larger than the first interference threshold value that is output to the interference comparator, the interference threshold value calculator calculates a second interference threshold value that is larger than the first interference threshold value according to a request received from the interference comparator after outputting the first interference threshold value, and outputs the calculated second interference threshold value to the interference comparator, and
   when the interference parameter is smaller than the first interference threshold value that is output to the interference comparator, the interference threshold value calculator calculates a third interference threshold value that is smaller than the first interference threshold value according to a request received from the interference comparator after outputting the first interference threshold value, and outputs the calculated third interference threshold value to the interference comparator.

4. The base station device according to claim 1, wherein the weighting factor calculator increases a third weighting factor used for allocating a third band to the first mobile station that is different from the first band or the second band when the level of interference represented by the interference parameter is larger than the level of interference represented by the interference threshold value.

5. The base station device according to claim 1, wherein the interference parameter is a received power received by the first mobile station from a base station device forming the second region,
   the interference comparator compares the received power received by the first mobile station from a base station device forming the second region with the interference threshold value, and obtains a correction power level indicating a difference between the received power and the interference threshold value, and
   when the second band is allocated to the first mobile station, the allocation unit notifies the first mobile station that a transmission power level used by the first mobile station to communicate with a base station device forming the first region is being reduced by the amount of the correction power level.

6. A computer-readable, non-transitory medium storing a program that causes a computer included in a base station device that forms a first region to execute a function in a system in which a first band is allocated on a priority basis to a first mobile station located in the first region and a second band is allocated on a priority basis to a second mobile station located in a second region, to execute a procedure, the procedure comprising:
   receiving
      an interference parameter indicating a level of interference caused by the first mobile station in communications of the second mobile station and
      a state parameter representing a communication state of the first mobile station;
   comparing the interference parameter with a predetermined interference threshold value;
   comparing the state parameter with a predetermined communication threshold;

calculating an allocating factor used for allocating the communication band and a weighting factor for weighting the allocating factor;

allocating each communication band to a mobile station having a largest product of the allocating factor and the weighing factor; and transmitting information of an allocated band to the first mobile station, wherein the calculating increases a first weighting factor used for allocating the first band to the first mobile station when a level of a communication state represented by the state parameter is smaller than a level of a communication state represented by the communication threshold value, and the calculating reduces a second weighting factor used for allocating the second band to the first mobile station when a level of interference represented by the interference parameter is larger than a level of interference represented by the interference threshold value, and a level of a communication state represented by the state parameter is larger than a level of a communication state represented by the communication threshold value.

7. A method of allocating a communication band used in a system in which a first band is allocated on a priority basis to a first mobile station located in a first region, and a second band is allocated on a priority basis to a second mobile station located in a second region, the method comprising:

receiving
an interference parameter indicating a level of interference caused by the first mobile station in communications of the second mobile station and
a state parameter representing a communication state of the first mobile station;

comparing the interference parameter with a predetermined interference threshold value;

comparing the state parameter with a predetermined communication threshold;

calculating an allocating factor used for allocating the communication band and a weighting factor for weighting the allocating factor;

allocating each communication band to a mobile station having a largest product of the allocating factor and the weighting factor; and transmitting information of an allocated band to the first mobile station, wherein the calculating increases a first weighting factor used for allocating the first band to the first mobile station when a level of a communication state represented by the state parameter is smaller than a level of a communication state represented by the communication threshold value, and the calculating reduces a second weighting factor used for allocating the second band to the first mobile station when a level of interference represented by the interference parameter is larger than a level of interference represented by the interference threshold value, and a level of a communication state represented by the state parameter is larger than a level of a communication state represented by the communication threshold value.

8. A base station device used in a system in which a first band is allocated on a priority basis to a first mobile station located in a first region, and in which a second band is allocated on a priority basis to a second mobile station located in a second region, the base station device comprising:

a receiver to receive an interference parameter indicating a level of interference caused by the first mobile station in communications of the second mobile station;

an interference comparator to compare the interference parameter with a predetermined interference threshold value;

an allocating factor calculator to calculate an allocating factor used for allocating the communication band;

a weighting factor calculator to calculate a weighting factor for weighting the allocating factor;

an allocation unit to allocate each communication band to a mobile station having a largest product of the allocating factor and the weighting factor;

a first pattern determining unit to determine a first weighting pattern in which a first band priority indicating a priority of allocating the first band to the first mobile station is larger than a second band priority indicating a priority of allocating the second band to the first mobile station when a level of a communication state represented by the state parameter is smaller than a level of a communication state represented by the communication threshold;

a second pattern determining unit to determine a second weighting pattern in which the second band priority is smaller than the first band priority when a level of interference represented by the interference parameter is larger than a level of interference represented by the interference threshold value; and a transmitter to transmit information of an allocated band to the first mobile station, wherein the weighting factor calculator
reduces a weighting factor used for allocating the second band to the first mobile station when the level of interference represented by the interference parameter is larger than the level of interference represented by the interference threshold value, and
calculates a weighting factor used for allocating the first band as a product of the first band priority included in the first weighting pattern and the second weighting pattern, and calculates a weighting factor used for allocating the second band as a product of the second band priority included in the first weighting pattern and the second weighting pattern.

* * * * *